US012670149B1

(12) United States Patent
Singh

(10) Patent No.: US 12,670,149 B1
(45) Date of Patent: Jun. 30, 2026

(54) DETECTION AND CORRECTION OF INACCURATE NUMERIC COMPARISONS IN LLM RESPONSES

(71) Applicant: ORACLE INTERNATIONAL CORPORATION, Redwood Shores, CA (US)

(72) Inventor: Jyotika Singh, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/004,956

(22) Filed: Dec. 30, 2024

(51) Int. Cl.
  *G06F 16/00* (2019.01)
  *G06F 16/242* (2019.01)
  *G06F 16/28* (2019.01)

(52) U.S. Cl.
  CPC ........ *G06F 16/2425* (2019.01); *G06F 16/243* (2019.01); *G06F 16/285* (2019.01)

(58) Field of Classification Search
  CPC ... G06F 16/2425; G06F 16/243; G06F 16/285
  See application file for complete search history.

(56) References Cited

U.S. PATENT DOCUMENTS

| | | | | |
|---|---|---|---|---|
| 8,331,739 | B1 * | 12/2012 | Abdulkader | G06V 30/248 |
| | | | | 358/1.11 |
| 10,867,380 | B1 * | 12/2020 | Pathan | G06T 7/12 |
| 11,688,393 | B2 | 6/2023 | Medalion et al. | |
| 12,487,852 | B1 * | 12/2025 | Walsh | G06F 9/4881 |
| 12,487,874 | B1 * | 12/2025 | Engel | G06F 11/0769 |
| 2006/0282762 | A1 * | 12/2006 | Diamond | G06F 40/169 |
| | | | | 715/235 |
| 2007/0006034 | A1 * | 1/2007 | Bangel | G06Q 10/08 |
| | | | | 714/37 |

(Continued)

FOREIGN PATENT DOCUMENTS

| | | |
|---|---|---|
| CN | 110909226 A | 3/2020 |
| CN | 117216051 A | 12/2023 |

(Continued)

OTHER PUBLICATIONS

Zikai Zie: "Order Matters in Hallucination: Reasoning Order as Benchmark and Reflexive Prompting for Large- Language-Models", retrieved from arXiv:2408.05093v2 [cs.CL] 16Aug2024 (8 pgs).

(Continued)

*Primary Examiner* — Noosha Arjomandi
(74) *Attorney, Agent, or Firm* — Kraguljac Law Group LLC

(57) ABSTRACT

Systems, methods, and other embodiments are described herein which are associated with detection and correction of large language model responses in natural language that contain inaccurate numeric comparisons. In one embodiment, a method includes intercepting an initial response by a large language model to an initial prompt. The method includes detecting that the initial response contains an inaccuracy in a numeric comparison based on a validation check of the numeric comparison. The method includes generating an alternative prompt to the large language model that is configured to cause the large language model to correct the inaccuracy in a rectified response. And, the method includes returning the rectified response by the large language model to the alternative prompt in place of the initial response.

20 Claims, 8 Drawing Sheets

(56) References Cited

U.S. PATENT DOCUMENTS

| | | | | |
|---|---|---|---|---|
| 2009/0106626 A1* | 4/2009 | Hou | .................. | H03M 13/1197 |
| | | | | 714/E11.017 |
| 2013/0055018 A1* | 2/2013 | Joshi | .................. | G06F 11/2082 |
| | | | | 714/E11.127 |
| 2017/0122743 A1* | 5/2017 | Steinhardt | ............ | G01C 21/188 |
| 2024/0372830 A1* | 11/2024 | Vörös | ................. | H04L 63/0236 |
| 2024/0394118 A1* | 11/2024 | Overmyer | .......... | G06F 11/3688 |
| 2025/0086425 A1* | 3/2025 | Liu | ........................ | G06N 3/045 |
| 2025/0245351 A1* | 7/2025 | Rahman | ............. | G06F 11/3684 |
| 2025/0291828 A1* | 9/2025 | Wood | ................... | G06F 16/283 |
| 2025/0292067 A1* | 9/2025 | Jack | ................... | H04L 63/0421 |
| 2025/0363907 A1* | 11/2025 | Montgomery | .......... | G09B 7/04 |
| 2025/0377864 A1* | 12/2025 | Dangi | ...................... | G06F 8/33 |

FOREIGN PATENT DOCUMENTS

| | | |
|---|---|---|
| CN | 117669727 A | 3/2024 |
| CN | 118170906 A | 6/2024 |

OTHER PUBLICATIONS

Chung-Chi Chen, et al.: "Improving Numeracy by Input Reframing and Quantitative Pre-Finetuning Task", Findings of the Association for Computational Linguistics: EACL 2023, pp. 69-77, May 2-6, 2024, 2023 Association for Computational Linguistics (9 pgs).

WHYLABS: "7 Ways to Evaluate and Monitor LLMs", retrieved from https://whylabs.ai/blog/posts/7-ways-to-evaluate-and-monitor-llms May 13, 2024 (18 pgs).

Tianyu Cao et al.: "Characterizing Multimodal Long-form Summarization: A Case Study on Financial Reports", Published as a conference paper at COLM 2024, retrieved from arXiv:2404.06162v3 [cs:CL] Aug. 15, 2024 (17 pgs).

Eric Wallace, et al.: "Do NLP Models Know Numbers? Probing Numeracy in Embeddings", retrieved from arXiv:1909.07940v2 [cs:CL] Sep. 18, 2019 (12 pgs).

Yiran Wu, et al.: "MathChat: Converse to Tackle Challenging Math Problems with LLM Agents", Accepted at the ICLR 2024 Workshop on LLM Agents, retrieved from arXiv:2306.01337v3 [cs: CL] Jun. 28, 2024 (22 pgs).

Zhang, Hugh et al.: "A Careful Examination of Large Language Model Performance on Grade School Arithmetic", retrieved from arXiv:2405.00332v1 [cs.CL] on May 1, 2024 (32 pgs).

* cited by examiner

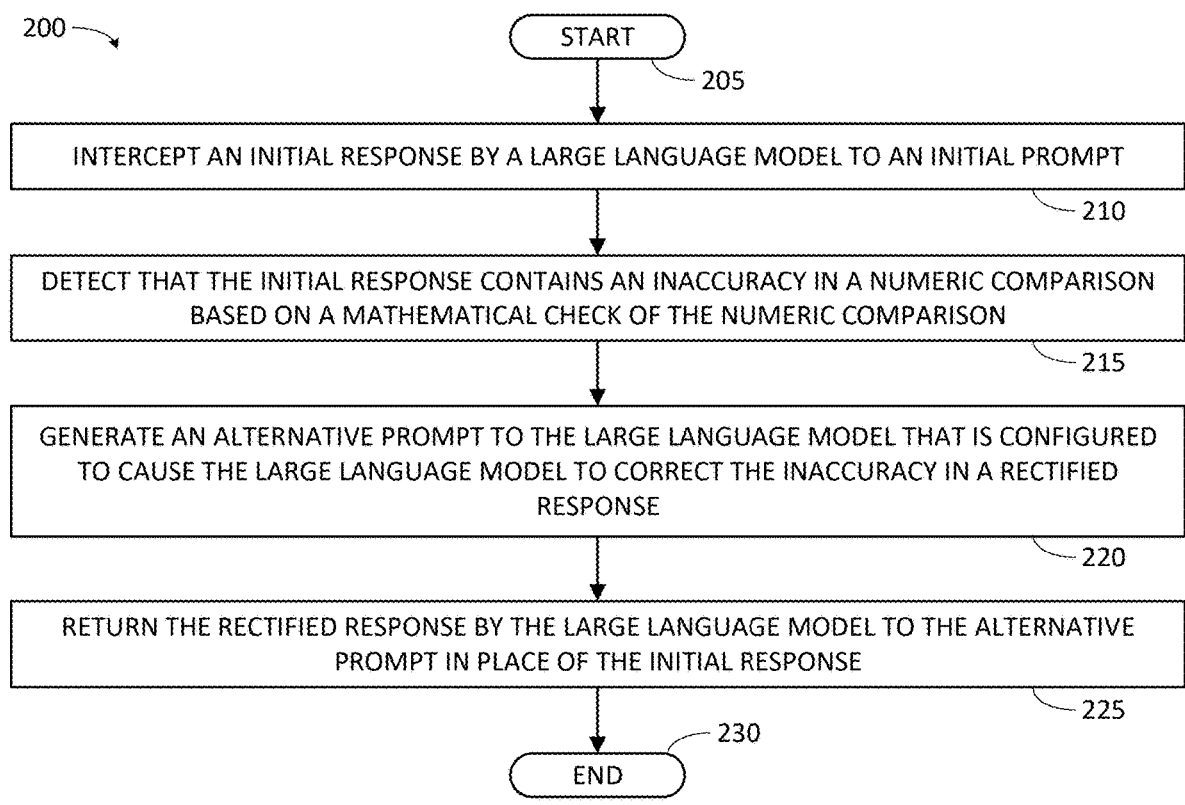

200

START
205

INTERCEPT AN INITIAL RESPONSE BY A LARGE LANGUAGE MODEL TO AN INITIAL PROMPT
210

DETECT THAT THE INITIAL RESPONSE CONTAINS AN INACCURACY IN A NUMERIC COMPARISON BASED ON A MATHEMATICAL CHECK OF THE NUMERIC COMPARISON
215

GENERATE AN ALTERNATIVE PROMPT TO THE LARGE LANGUAGE MODEL THAT IS CONFIGURED TO CAUSE THE LARGE LANGUAGE MODEL TO CORRECT THE INACCURACY IN A RECTIFIED RESPONSE
220

RETURN THE RECTIFIED RESPONSE BY THE LARGE LANGUAGE MODEL TO THE ALTERNATIVE PROMPT IN PLACE OF THE INITIAL RESPONSE
225

230

END

FIG. 2

RELATIVE NUMERICAL EVALUATION: HIGH-LEVEL SYSTEM CONCEPT 300

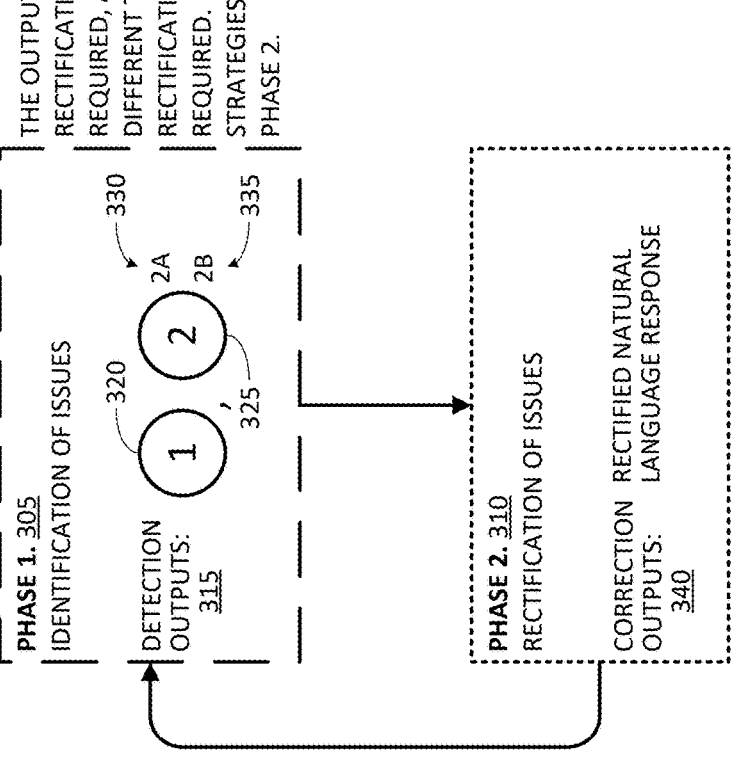

PHASE 1. 305
IDENTIFICATION OF ISSUES

DETECTION OUTPUTS: 315

320

325

330 → 2A

335 → 2B

THE OUTPUTS INDICATE IF RECTIFICATION IS REQUIRED, AND THE DIFFERENT TYPES OF RECTIFICATIONS REQUIRED. THIS INFORMS STRATEGIES USED IN PHASE 2.

PHASE 2. 310
RECTIFICATION OF ISSUES

CORRECTION OUTPUTS: 340

RECTIFIED NATURAL LANGUAGE RESPONSE

REPEAT PHASE 1 – PHASE 2 THREE TO FOUR TIMES WITH DIFFERENT PROMPTING STRATEGIES UNTIL THERE IS NO FURTHER NEED FOR RECTIFICATION (RECTIFICATION REQUIRED = FALSE).

THE SYSTEM INCLUDES TWO PHASES. EACH PHASE INVOLVES A LARGE LANGUAGE MODEL (LLM), AMONGST OTHER COMPONENTS. FOR THE LLM COMPONENT, EACH PHASE HAS A PROMPT SELECTION STRATEGY.

PHASE 1 – PHASE 2 ARE REPEATED A FEW TIMES, IF DEEMED NECESSARY, WITH ROTATION IN PROMPT SELECTION STRATEGIES, UNTIL NO MORE ISSUES ARE SPOTTED.

FIG. 3

EXAMPLE WITH RE-TRIES 700
Initial (1st) NL RESPONSE 705 = "2023 revenue was 103849, same as the 2022 revenue of 384948."
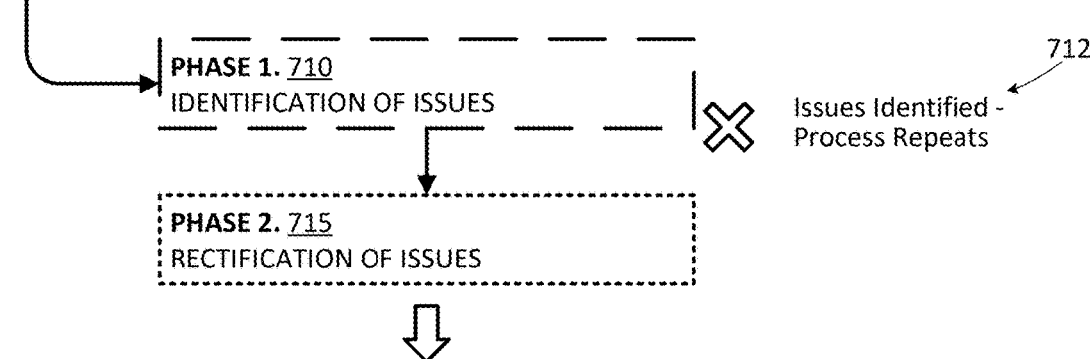
NEW (2nd) NL RESPONSE 720 = "In 2023, revenue was 103,849, which is higher than the 2022 revenue of 384,948."
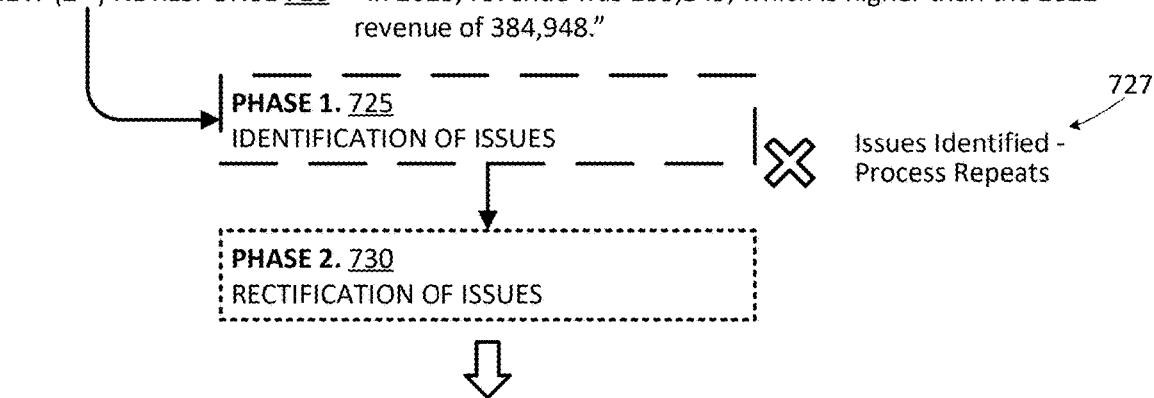
NEW (3rd) NL RESPONSE 735 = "In 2023, revenue was 103,849, which is lower than the 2022 revenue of 384,948."
PHASE 1. 740
IDENTIFICATION OF ISSUES
742
No Issues -
Process Ends
FIG. 7

DETECTION AND CORRECTION OF INACCURATE NUMERIC COMPARISONS IN LLM RESPONSES

BACKGROUND

A large language model (LLM) is a type of artificial intelligence trained on a large body of text data to generate human-like language, understand context, and perform a wide range of natural language processing tasks. LLMs are trained on text and do not have expertise in mathematical operations or statistical operations. LLMs often misunderstand—and therefore inaccurately describe—statistical operations, mathematical operations, or other numerical relationships.

The lack of numeracy in LLMs presents a technical problem in an emerging field of LLM summarization and description of numeric data: when tasked with describing a collection of numeric data, the LLM may (1) make incorrect comparisons between numbers, (2) incorrectly quantify relationships between numbers, or even (3) introduce numbers that have no basis in the numeric data. Moreover, these errors go undetected by computing systems because they occur in strings of text produced by the LLM, rather than in mathematical operations. One prior attempt to detect and correct inaccurate numeric comparison obtains multiple LLM comparisons of the numeric data and checks them for consistency, but this technique fails to detect errors when the responses are consistently inaccurate and wastefully uses the compute resources of the LLM to generate the multiple responses. Another prior attempt to detect and correct inaccurate numeric comparison evaluated LLM output against a separate reference text that is not part of the LLM response. But, this technique is inaccurate for detection and unduly constraining to the LLM output because a comparison between numbers may be correctly phrased in a far wider variety of ways than can be expressed by reference texts. Further, such reference texts are generally not available in real-world applications. Prior techniques also do not detect or correct inaccurate quantifications of difference in a comparison. Thus, there exists a need to detect and correct errors in numeric comparisons by the LLM that allows for free-expression by the LLM, without use of a reference text, while enforcing mathematically accurate (and not merely consistent) comparisons of the numeric data, including quantifications of differences in the comparison.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates one embodiment of a comparison correction method that is associated with detection and correction of LLM responses that contain inaccurate numeric comparisons.

FIG. 3 illustrates one embodiment of a high-level system concept using relative numerical evaluation for comparison correction which is associated with detection and correction of LLM responses that contain inaccurate numeric comparisons.

FIG. 7 illustrates an example with re-tries of a comparison correction process that is associated with detection and correction of LLM responses that contain inaccurate numeric comparisons.

DETAILED DESCRIPTION

Figure 1:
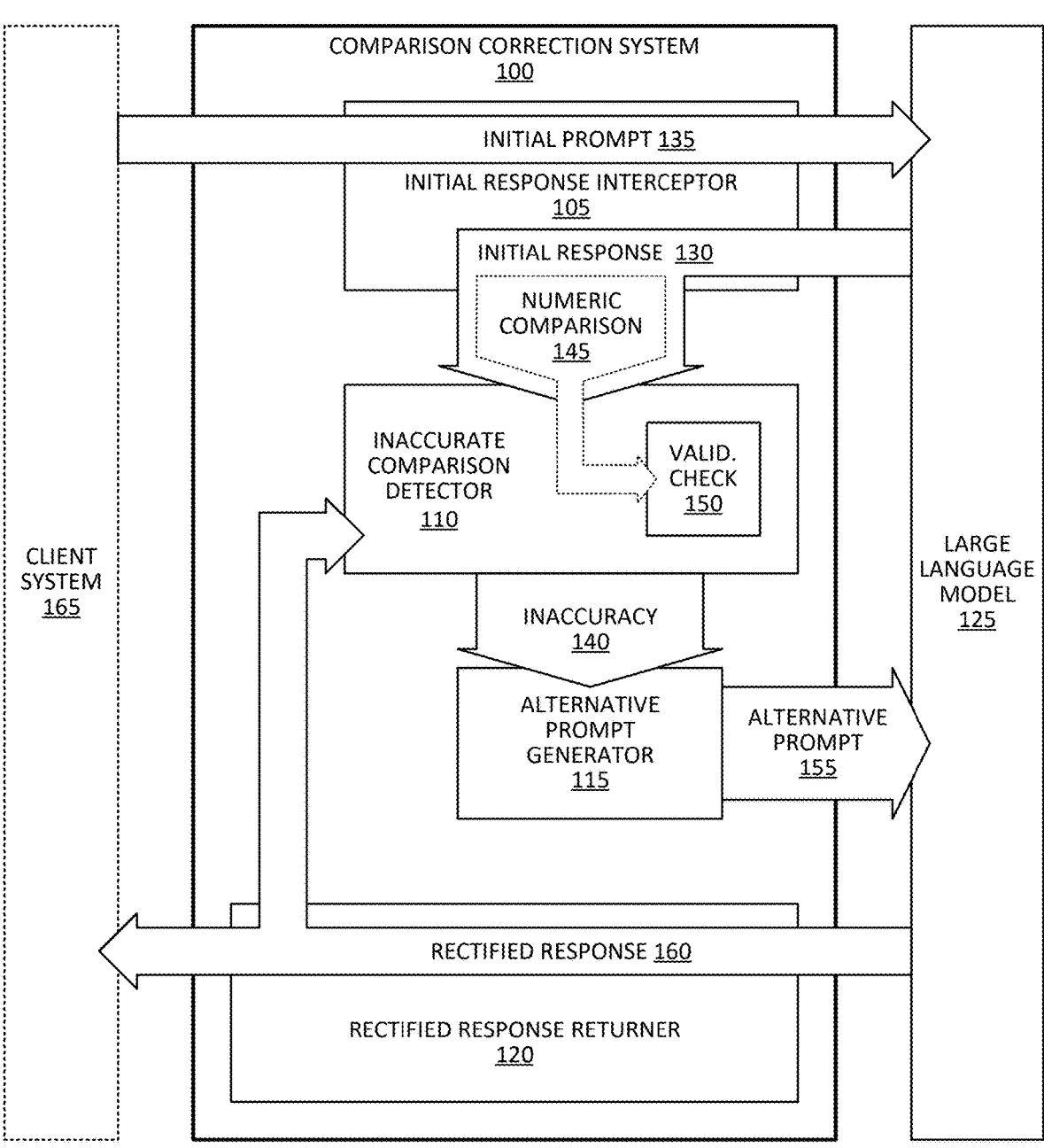
FIG. 1 illustrates one embodiment of a comparison correction system that is associated with detection and correction of LLM responses that contain inaccurate numeric comparisons.

Systems, methods, and other embodiments are described herein that provide detection and correction of LLM responses that contain inaccurate numeric comparisons. In one embodiment, a comparison correction system automatically intercepts erroneous numerical comparisons in natural language (NL) LLM responses and replaces the initial response with a new NL response in which the comparison is corrected. For example, the comparison correction system evaluates LLM responses that include numbers to automatically detect inaccuracies with numbers and number comparisons in the LLM responses, and then rectifies the response by prompting the LLM to generate a new NL response based on further knowledge of the type of the inaccuracy. In this way, the comparison correction system ensures that numeric comparisons in NL responses produced by an LLM are accurate.

In one embodiment, the comparison correction system intercepts an initial NL response from an LLM before it is returned to a client system, and detects whether the initial NL response expresses an inaccurate comparison between numbers. The check is based on validation—that is, evaluation of truth or falsity—of numeric comparison. Where the check fails, the comparison correction system has detected an inaccuracy, and proceeds to generate an alternative prompt that is configured to cause the LLM to correct the inaccuracy. In response to the alternative prompt, the LLM produces a rectified response in which the comparison is accurate. The rectified response is substituted for the initial NL response and returned to the client system.

In one embodiment, the comparison correction improves the technology of LLMs in several ways. One previous approach to correction of comparison inaccuracies (Xie, Order Matters in Hallucination: Reasoning Order as Benchmark and Reflexive Prompting for Large Language Models) attempts to resolve inconsistencies between duplicative numeric comparisons with the LLM. But, this previous approach: (1) will not detect inaccuracy where the duplicative comparisons arrive at consistent, but inaccurate, comparisons; (2) may resolve inconsistency in favor of the inaccurate comparison, and (3) does not detect or correct inaccurate quantifications of difference in a comparison. Another approach to correction of comparison inaccuracies refers to a reference text that describes the data to determine whether a comparison is in error, and, in some cases, to provide a correction, but this is not scalable to new datasets, and further undesirably constrains the LLM to describe the relationships as provided by the reference text.

In one embodiment, the comparison correction system described herein improves over these previous approaches by detecting and correcting errors in numeric comparisons by the LLM in a manner that allows for free-expression by the LLM while enforcing mathematically accurate (and not merely consistent) comparisons of the numeric data, including quantifications of differences in the comparison. In the comparison correction system, the comparisons are extracted from the NL and checked for validity outside of LLM reasoning, increasing accuracy of detection of comparisons that are inaccurate and providing correction with accurate comparison. And, in one embodiment, when the comparison correction system described herein is employed, the comparison correction system detects and corrects inaccurate statements of difference in addition to relative comparisons of size, which was not previously possible in this or other previous approaches. As another advantageous improvement, in one embodiment, the comparison correction system improves the accuracy of numeric comparisons in NL output of LLMs without computationally expensive fine-tuning of the LLM for the task of numeric comparison.

No action or function described or claimed herein is performed or performable by the human mind. An interpretation that any action or function can be performed in the human mind is inconsistent with and contrary to this disclosure.

—Example Comparison Correction System—

FIG. 1 illustrates one embodiment of a comparison correction system 100 that is associated with detection and correction of LLM responses that contain inaccurate numeric comparisons. In one embodiment, comparison correction system 100 operates to replace LLM responses that include incorrect comparisons between numbers with rectified responses in which the comparison between the numbers is correct. Comparison correction system 100 has various components, including initial response interceptor 105, inaccurate comparison detector 110, alternative prompt generator 115, and rectified response returner 120. Comparison correction system 100 intercepts and corrects (as needed) NL comparisons between numbers that are generated by an LLM 125. In one embodiment, the components of comparison correction system 100 and LLM 125 intercommunicate in a network computing system, for example by electronic messages, as discussed below under the heading "Cloud or Enterprise Embodiments."

In one embodiment, initial response interceptor 105 is configured to intercept an initial response 130 by an LLM 125 to an initial prompt 135. The initial response 130 is in natural language. In one embodiment, inaccurate comparison detector 110 is configured to detect that the initial response 130 contains an inaccuracy 140 in a numeric comparison 145 based on a validation check 150 of the numeric comparison 145. In one embodiment, alternative prompt generator 115 is configured to generate an alternative prompt 155 to the LLM 125 that is configured to cause the LLM 125 to correct the inaccuracy 140 in a rectified response 160. In one embodiment, rectified response returner 120 is configured to return the rectified response 160 by the LLM 125 to the alternative prompt 155 in place of the initial response 130. The rectified response 160 is in natural language. The initial prompt 135 may be received from a client system 165, and the rectified response 160 may be returned to the client system 165.

Further details regarding comparison correction system 100 are presented herein. In one embodiment, operations of comparison correction system 100 will be described with reference to comparison correction method 200 of FIG. 2. In one embodiment, a high-level system concept for the relative numerical evaluation and correction that may be performed by comparison correction system 100 will be described with reference to high-level system concept 300 of FIG. 3. In one embodiment, a discussion of a first phase for identification of issues with numeric comparison in NL responses that may be performed by comparison correction system 100 will be described with reference to overview of phase 1 400 of FIG. 4. In one embodiment, a discussion of a second phase for rectification of the issues with numeric comparison that may be performed by comparison correction system 100 will be described with reference to overview of phase 2 500 of FIG. 5. In one embodiment, example walkthroughs of issue identification in phase 1 and issue rectification in phase 2 that may be performed by comparison correction system 100 will be described with reference to example walkthrough 600 of FIG. 6. In one embodiment, a looping re-iteration though phase 1 and phase 2 to try to rectify the issues until arrival at a rectified response that may be performed by comparison correction system 100 will be described with reference to example with re-tries 700 of FIG. 7.

—Example Comparison Correction Method—

FIG. 2 illustrates one embodiment of a comparison correction method 200 that is associated with detection and correction of LLM responses that contain inaccurate numeric comparisons. In one embodiment, as a general overview, comparison correction method 200 intercepts an initial response by a large language model to an initial prompt. Comparison correction method 200 detects that the initial response contains an inaccuracy in a numeric comparison based on a validation check of the numeric comparison. Comparison correction method 200 generates an alternative prompt to the large language model that is configured to cause the large language model to correct the inaccuracy in a rectified response. And, comparison correction method 200 returns the rectified response by the large language model to the alternative prompt in place of the initial response.

In one embodiment, comparison correction method 200 initiates at START block 205 in response to comparison correction system 100 determining that one or more conditions or events have been detected or have occurred. The conditions or events for initiating comparison correction method 200, include, but are not limited to: (1) comparison correction system 100 has received an instruction to check numeric comparisons in an NL response for inaccuracies; (2) comparison correction system 100 has received an instruction to correct or rectify inaccurate numeric comparisons in an NL response; (3) comparison correction system 100 has received an NL response that contains numeric comparisons from an LLM; (4) a user or administrator has initiated comparison correction method 200; (5) it is currently a time at which comparison correction method 200 is scheduled to be run; or (6) some other condition for commencing comparison correction method 200 has been satisfied. As used herein, the use of the term "in response to" indicates that an action or task is automatically initiated, carried out, completed, or otherwise performed automatically upon the occurrence of an event.

In one embodiment, a computing system configured by computer-executable instructions to execute functions of comparison correction system 100 executes comparison correction method 200. In one embodiment, at START block 205, comparison correction system 100 configures compute resources for performing comparison correction method 200. (1) comparison correction system 100 provisions (i.e., allocates and initializes) resources of the computing system that are used by comparison correction system 100, such as processor, memory and storage (for example, for executing components of comparison correction system 100). (2) comparison correction system 100 establishes access to one or more networks for the resources, such as access to (a) internal networks for communication among components of comparison correction system 100 and (b) external networks for communication with other computing systems (for example, client systems or LLM 125). (3) comparison correction system 100 connects to data sources (such as databases, data stores, file systems, and cloud storage) used by the comparison correction method 200. And, (4) comparison correction system 100 configures the computing system with system settings, software dependencies and libraries, and modules for executing the components of comparison correction system 100. Following initiation at START block 205, comparison correction method 200 proceeds to block 210.

At block 210, comparison correction method 200 intercepts an initial response 130 by a large language model 125 to an initial prompt 135. In one embodiment, the initial response 130 is in natural language. In one embodiment, the comparison correction method 200 is configured to capture and store the NL text output by the LLM (initial response 130) following its receipt of NL text input (initial prompt 135). For example, the comparison correction method 200 actively monitors an application programming interface (API) endpoint of the LLM 125 to record (e.g., in memory or storage) the initial response 130 generated by the LLM 125 as a reply following submission of the initial prompt though the API endpoint of the LLM 125.

In one embodiment, the initial response 130 is a natural language response that is originally produced by the LLM 125 in response to a prompt, for which numeric comparison inaccuracies in the response have not yet been detected or rectified (for example as discussed herein below). In one embodiment, the initial prompt 135 is a natural language instruction that is originally provided to the LLM 125 to cause generation of the initial response 130. The initial response 130 and the initial prompt 135 may also be referred to herein as the "original response" and the "original prompt," respectively. The comparison correction method may repeat the steps of blocks 210, 215, and 220 through a plurality of iterations that attempt to rectify new numeric comparison errors that may be introduced in a rectified response 160. In these subsequent iterations performed where a first attempt to rectify numeric comparison errors did not eliminate numeric comparison errors from the rectified response, the initial or original response for the subsequent iteration is the rectified response for the previous or prior iteration (which may still contain numeric comparison errors).

To intercept the initial response 130, comparison correction method 200 collects the initial response 130 and redirects the initial response 130 away from a client system 165 that provided the initial prompt 135 and into an issue identification analysis (discussed for example at block 215 and phase 1 305). The initial response 130 is stopped from being returned to the client system 165. The initial response 130 is either (1) withheld from being returned to the client system where an inaccuracy 140 in the numeric comparison 145 is detected in the initial response 130 by the issue identification analysis, or (2) returned to the client system after the initial response 130 is confirmed to be free of inaccuracies 140 in numeric comparison 145. If indicated by the issue identification analysis, inaccuracy 140 in numeric comparison 145 will be corrected (as discussed for example at block 220 and phase 2 310) in a rectified response 160, which will be returned to the client system 165 in place of initial response 130 (discussed for example at block 225). In one embodiment, the client system 165 is an NL user interface to a structured database (for example as discussed below under the heading "Comparison Correction System—Example Use Case").

In one embodiment, the comparison correction method 200 also captures the initial prompt 135 as input. The initial prompt 135 may include tabular data (or other structured data) served by a database in response to executing a query on the database. The structured data may include numerical data, which may be referred to occasionally herein as "source numerical data" because it is obtained or sourced from the structured data. The initial response 130 may include "generated numerical data." Generated numerical data is so called because it is generated by the LLM 125 rather than retrieved from a source. The initial prompt 135 may include a request or instruction to the LLM to describe the structured data in some way, for example, to compare various values in the structured data, such as revenue values from respective years.

In one embodiment, the initial prompt 135 (and other prompts) are passed to the LLM as one or more messages in JavaScript Object Notation (JSON), markdown, or other types of structured data storage formats. The messages may include the text of the prompt, a max of tokens for the response, a value for a temperature hyperparameter, a value for a sampling hyperparameter (such as top-p or top-k), and/or other input parameters. In one embodiment, input parameters may be used to adjust prompt strategies over multiple iterations to elicit rectified comparisons (as discussed below with reference to phase 2 310). In one embodiment, the initial response 130 by the LLM 125 (and other responses by LLMs) is structured as one or more JSON messages containing the generated NL text of the initial response 130, a count of tokens in the response, the initial prompt 135 (or other prompt) for which the response is generated, and/or other output parameters, status messages, or metadata.

In one embodiment, the comparison correction method 200 may be applied to a wide variety of types of LLM 125 to detect and correct inaccurate numerical comparisons in NL responses, thereby improving the accuracy of the LLM 125. The comparison correction method 200 is compatible with a wide range of LLMs, including but not limited to GPT, Cohere, BERT, and other models.

In one embodiment, comparison correction method 200 intercepts an initial response 130 by LLM 125 to an initial prompt by: (1) accessing the initial prompt 135 directed to the LLM 125 by a client system 165; (2) capturing the initial response 130 after generation by LLM 125, and preventing the initial response 130 from being returned to the client system 165; and (3) forwarding the captured initial response 130 response for a validation check 150 on numeric comparison(s) 145.

In one embodiment, the steps of block 210 are performed by initial response interceptor 105. At the conclusion of block 210, comparison correction method 200 has captured and redirected the initial response 130 for subsequent analysis of whether the numeric comparisons the initial response 130 contains, if any, are accurate. The initial response 130 and other associated data may be transmitted as messages configured to cause detection of an inaccuracy 140 (or other downstream processing) to commence. Processing continues to block 215.

In one embodiment, prior to commencing block 215, comparison correction method 200 performs an initial check for unverifiable numbers in the initial response 130 that are not present in the structured data provided in the initial prompt 135. As discussed in further detail below with reference to numerical data match 410 with source, comparison correction method 200 may verify that the numerical data from the initial response 130 are also in the structured data. For example, comparison correction method 200 (1) extracts the source numerical data from the structured data, extracts the generated numerical data from the initial response 130, and compares the source numerical data and generated numerical data to confirm that numbers in the generated numerical data are also present in the source numerical data.

At block 215, comparison correction method 200 detects that the initial response 130 contains an inaccuracy 140 in a numeric comparison 145 based on a validation check 150 of the numeric comparison. In one embodiment, comparison correction method 200 detects the comparison and extracts the numbers and relationship(s) involved. Comparison correction method 200 then reconstructs the comparison as a mathematical expression and detects an inaccuracy when the mathematical expression is a false statement. Comparison correction method 200 extracts the math of the numeric comparison from the NL of the initial response, then checks it for errors that show inaccurate comparison.

In one embodiment, as described below with reference to phase 1 305, comparison correction method detects comparative language in the initial response 130, then classifies the comparative language as expressing a particular type of relative relationship between numbers and/or an arithmetic difference between numbers. This detection and comparison may be performed using one or more of lexical, semantic, and syntactical analyses, for example based on comparison with words that indicate comparative language. A machine learning classification model may be used as well to classify type of relative relationship between numbers present in any piece of text, with or without multi-class and/or multi-label classifications.

The system then extracts the values of the numbers from the initial response with an LLM. As discussed below with reference to prompt selection 445, comparison correction method 200 chooses a pre-configured prompt based on the type of relationship. The pre-configured prompt is configured to cause the LLM to return the numeric values that are arranged in the initial response 130 in accordance with the type of relationship.

Comparison correction method 200 builds a mathematical expression of the numeric comparison from the values and relationship extracted from the initial response 130 and then performs validation check 150. As discussed below with reference to validation check for correctness 460, validation check 150 determines whether the numeric comparison is mathematically accurate, for example by evaluating the truth or falsity of the mathematical expression. The mathematical expression may include a logical expression of a relative relationship between numbers, or an arithmetic expression of a difference between numbers. Comparison correction method 200 may thus detect both (1) that a relationship between two numbers in the initial response 130 is incorrect (and therefore the relationship needs rectification); and (2) that that a difference value in the initial response 130 is incorrect (and therefore the difference needs rectification).

In one embodiment, comparison correction method 200 detects that the initial response 130 contains an inaccuracy in a numeric comparison based on a validation check of the numeric comparison as follows. (1) Comparison correction method 200 detects language that indicates the numeric comparison 145 in the initial response 130.

(2) Based on the detected language, comparison correction method 200 classifies the numeric comparison 145 as expressing a particular type of relationship between a first number and a second number. In one embodiment, the relationship is one of: (i) higher than, (ii) equal to, or (iii) lower than. In one embodiment, the relationship may also be one of (i) percentage increase (e.g., x is 5% higher than y), (ii) percentage decrease (e.g., x is 5% lower than y), (iii) fractional increase (e.g., x is ⅓ higher than y), (iv) fractional decrease (e.g., x is ¼ lower than y), (v) multiplicative increase (e.g., x is 3.4 times higher than y), or (vi) multiplicative decrease (e.g., x is 1.2 times lower than y).

(3) Comparison correction method 200 submits to an LLM (such as LLM 125) an additional prompt that corresponds to the relationship. The additional prompt is configured to cause the LLM to extract the first number and the second number from the initial response 130. Note that an individual response (such as initial response 130) may include multiple relationships between numbers. Accordingly, in one embodiment, comparison correction method 200 may submit a prompt configured to detect and extract any count of numbers from the initial response 130, and not just 2 numbers. Individual relationships between the pairs of numbers that are described in the initial response will be processed pair-by-pair, that is, comparison-by-comparison, in downstream processing. For example, the following processes (4) and (5) may be repeated for each of pair of numbers with a described comparative relationship.

(4) Comparison correction method 200 populates a mathematical expression of the numeric comparison with the first number, relationship, and the second number. And, (5) comparison correction method 200 evaluates the truth of the mathematical expression to perform the validation check 150 on the numeric comparison 145.

In one embodiment, where there is a difference between the first number and the second number expressed in the numeric comparison 145, comparison correction method 200 (i) detects that the difference is present, (ii) uses the additional prompt to extract the value of the difference, (iii) populates a further mathematical expression (such as a difference equation) with the first number, second number, and difference, and (iv) evaluates the truth of the further mathematical expression in the validation check 150.

In one embodiment, the steps of block 215 are performed by inaccurate comparison detector 110. At the conclusion of block 215, comparison correction method 200 has (1) determined whether rectification of a comparison in an NL response is indicated, and if so, (2) identified (i) rectification of a relationship described in the NL response or (ii) rectification of a difference described in the NL response as the category of rectification to be performed. These indications may be transmitted as messages configured to cause generation of an alternative prompt (or other downstream processing) to commence. Processing continues to block 220.

At block 220, comparison correction method 200 generates an alternative prompt 155 to the large language model 125. The alternative prompt 155 is configured to cause the large language model 125 to correct the inaccuracy 140 in a rectified response 160. In one embodiment, comparison correction method 200 constructs the alternative prompt 155 to guide or direct the LLM 125 toward correcting the inaccurate comparison. The alternative prompt 155 is configured to elicit rectified response 160: a new output from the LLM 125 that attempts to express the numeric comparison 145 accurately. Comparison correction method 200 thus creates a new prompt that leads the LLM 125 to adjust and correct the initial response 130 in a new response.

In one embodiment, the alternative prompt 155 is an alternative to the initial prompt 135 that is configured to provide additional context about the inaccuracy 140. In one embodiment, as discussed below with reference to the process of prompt creation and selection 515 in phase 2 310, comparison correction method 200 dynamically assembles the alternative prompt 155 based on (1) the specific type(s) of inaccuracy 140 detected in the initial response 130 and (2) the numeric values and relationship category extracted from the initial response 130. For example, the comparison correction method 200 first selects a template prompt that is associated with one of (1) rectification of relationship inaccuracy, (2) rectification of difference (or numeric representation of the difference) inaccuracy, or (3) rectification of both relationship inaccuracy and rectification of difference inaccuracy. Then, comparison correction method 200 populates the template prompt with (1) the extracted numeric values and relationship category and (2) actual values for the relationship category or for the difference (or numeric representation of the difference), or for both, that correct the inaccuracy 140. In this way, the comparison correction method 200 assembles an alternative prompt 155 that is tailored to rectify the specific issues in the initial response 130. In one embodiment, the difference may be represented numerically in a variety of ways other than as an amount or magnitude of the difference. For example, the difference may be represented numerically as a percentage increase or decrease, or as a fraction or ratio of increase or decrease.

In one embodiment, as discussed below with reference to phase 2 310, the comparison correction method 200 submits the alternative prompt 155 to LLM 125 to cause the generation of rectified response 160. As discussed below with reference to new NL response 525, LLM 125 generates the rectified response 160 in response to receiving the alternative prompt 155. Rectified response 160 is expected to resolve the inaccuracies 140 that were detected in initial response 130, subject to a further validation check such as is described in block 215.

In one embodiment, comparison correction method 200 generates an alternative prompt to the large language model that is configured to cause the large language model to correct the inaccuracy 140 with a rectified response 160 by: (1) selecting a template prompt assigned to the type(s) of inaccuracies detected; (2) determining actual values that correct the inaccurate values; and (3) populating the template prompt with the actual values, as well as numbers and relationship from the initial response 130 to cause the template prompt to describe the inaccuracies in the initial response 130. Thus created, the alternative prompt 155 may then be submitted to LLM 125, to cause generation of rectified response 160.

In one embodiment, the steps of block 220 are performed by alternative prompt generator 115. At the conclusion of block 220, comparison correction method 200 has generated an alternative prompt 155 that provides additional context configured to cause LLM 125 to correct the inaccuracy 140 in a new, rectified response 160. The alternative prompt 155 may be submitted to LLM 125 to cause generation of the rectified response 160 (or other downstream processing) to commence. Processing continues to block 225.

At block 225, comparison correction method 200 returns the rectified response 160 by the large language model 125 to the alternative prompt in place of the initial response. In one embodiment, the rectified response is in natural language. In one embodiment, comparison correction method 200 initially passes the rectified response to a further validation check to confirm that the comparison inaccuracies are resolved. If there are no further inaccuracies in numeric comparison present in the rectified response 160, comparison correction method 200 transmits the rectified response 160 back to the client system 165.

In one embodiment, the newly-generated rectified response 160 is passed back through the detection process of block 215 to check whether inaccuracies have been appropriately corrected. If so, then the rectified response 160 may be transmitted back to the client system 165 for display or other use. If inaccuracies remain (or new inaccuracies are detected), the comparison correction method may proceed again to the alternative prompt generation process of block 220. In iterations through alternative prompt generation, comparison correction method 200 may rotate prompt strategies to cause variation in the alternative prompts and consequent rectified responses, as discussed below with reference to phase 2 310 and example with re-tries 700.

In one embodiment, as discussed for example with re-tries 700, the comparison correction method 200 undergoes an iterative cycle of refinement until the rectified response achieves a pre-determined level of accuracy, such as absence of relationship inaccuracies and absence of difference inaccuracies. For example, comparison correction method 200 may iterate repeatedly through the steps of interception (block 210), detection (block 215), alternative prompt generation (block 220), and return of the rectified response (block 225) until either: (A) no further inaccuracy is detected, or (B) a threshold for number of iterations is satisfied.

Once no further inaccuracy is detected, the comparison correction method 200 returns the rectified response 160 that is current as of the final iteration to the client system 165. Comparison correction method 200 may cause the client to system to present the rectified response 160 in a natural language (or "conversational") user interface to a structured database. For example, the comparison correction method 200 may write the rectified response to an output stream of the NL user interface.

The threshold for number of iterations is a cap Con iterations to prevent further loop iterations where comparison correction method 200 is failing to rectify the comparison inaccuracies. If the cap on iterations is reached, comparison correction method 200 may return an error message to client system 165 along with the current rectified response. For example, the error message may state that there are relationship inaccuracies, difference inaccuracies, or both relationship inaccuracies and difference inaccuracies detected in the LLM response that could not be automatically corrected.

In one embodiment, comparison correction method 200 returns the rectified response by the large language model to the alternative prompt in place of the initial response by: (1) capturing the rectified response 160 upon its production by the LLM 125, (2) performing a validation check on the rectified response 160, (3) if the rectified response 160 passes the validation check, replace the initial response 130 with the rectified response 160 in an output queue to the client system 165, and (4) return the rectified response 160 to the client system 165 for presentation (e.g., display) in a user interface, replacing the inaccurate initial response 130.

In one embodiment, the steps of block 225 are performed by rectified response returner 120. At the conclusion of block 225, comparison correction method 200 has replaced an initial response 130 by LLM 125 that included one or more comparison inaccuracies with a rectified response that no longer includes the comparison inaccuracies. Processing continues to END block 230, where comparison correction method 200 concludes. In this manner, accuracy of the LLM outputs improves.

—Example Additional Features of Comparison Correction Method—

In one embodiment, detecting that the initial response contains the inaccuracy in the numeric comparison based on the validation check of the numeric comparison (as discussed above at block 215) includes steps for converting the numeric comparison from natural language to mathematical expression in order to perform the validation check. Comparison correction method 200 automatically constructs a mathematical expression of the numeric comparison from the NL of the initial response. And, comparison correction method 200 performs the validation check on the mathematical expression. The validation check on the mathematical expression detects the inaccuracy.

In one embodiment, detecting that the initial response contains the inaccuracy in the numeric comparison based on the validation check of the numeric comparison (as discussed above at block 215) includes steps for checking the comparison to determine whether the comparison is valid. The comparison is valid if the comparison is mathematically correct. Comparison correction method 200 detects language that indicates the numeric comparison in the initial response. Based on the detected language, comparison correction method 200 classifies the numeric comparison as a relationship between a first number and a second number that is one of: (i) higher than, (ii) equal to, or (iii) lower than. In one embodiment, in addition to the classes of relationship (i)-(iii) listed above, comparison correction method 200 may also classify the numeric comparison as a relationship between the first number and the second number that is one of: (iv) a percentage of (including percentage increase and percentage decrease); (v) fraction of (including fractional increase and fractional decrease); and (vi) multiple of (including multiplicative increase and multiplicative decrease). Comparison correction method 200 submits to the LLM an additional prompt that corresponds to the relationship. The additional prompt is configured to cause the LLM to extract the first number and the second number from the initial response. Comparison correction method 200 populates a mathematical expression of the numeric comparison with the first number, relationship, and the second number. And, comparison correction method 200 evaluates the truth of the mathematical expression to perform the validation check on the numeric comparison.

In one embodiment, detecting that the initial response contains the inaccuracy in the numeric comparison based on the validation check of the numeric comparison (as discussed above at block 215) includes steps for checking the validity of a difference (a figure produced by subtraction) included in the numeric comparison. Comparison correction method 200 detects that the initial response includes a difference value between the first number and the second number. Here, the additional prompt is further configured to cause the large language model to extract the difference value from the initial response. In one embodiment, the difference value is a quantity or magnitude by which the first number and second number differ from each other. In one embodiment, the difference value is a percentage, fraction, or multiplier (or other coefficient) by which the first number and second number differ from each other. Comparison correction method 200 populates an equation with the first number, the second number, and the difference value. The equation may be, for example, a difference equation that subtracts the second number from the first to find the difference value, or a coefficient equation that multiplies first number by the difference value to produce the second number. And, comparison correction method 200 evaluates the truth of the equation to perform the validation check on the numeric comparison.

In one embodiment, comparison correction method 200 further includes steps for initial detection of numbers that are not present in the structured data. In one embodiment, comparison correction method 200 further includes verifying that numerical data from the initial response also appear in structured data provided in the initial prompt. The structured data may be in a tabular format, or in other formats for data structures. In one embodiment, comparison correction method 200 accesses structured data that is included in the initial prompt to the large language model. Comparison correction method 200 extracts source numerical data from the structured data and generated numerical data from the initial response. And, comparison correction method 200 verifies the generated numerical data against the source numerical data.

In one embodiment, comparison correction method 200 further includes steps for iteratively repeating through one or more passes until no further inaccuracies occur in the rectified response. Once no further errors occur, the current rectified response (which is the latest rectified response in which no errors are detected) will be returned. Comparison correction method 200 repeats (i) intercepting of the initial response, (ii) detecting that the initial response contains the inaccuracy, and (iii) generating the alternative prompt (for example, including capturing the rectified response to the alternative prompt) until either: (A) no further inaccuracy is detected, or (B) a threshold for number of iterations is satisfied (or a cap on iterations is reached). Where no further inaccuracy is detected, the current rectified response is returned. The initial response for a given iteration is the rectified response for a prior iteration. Where steps of the comparison correction method 200 are iterated, comparison correction method 200 further includes changing prompt strategies from iteration to iteration.

In one embodiment, comparison correction method 200 further includes rotation of prompt strategies. During the generating the alternative prompt (discussed at block 220), comparison correction method 200 rotates through a plurality of prompt strategies. The rotation changes prompt strategies from iteration to iteration. The plurality of prompt strategies includes: (i) a first prompt strategy of passing error information about the inaccuracy to the large language model as context; and (ii) a second prompt strategy of responding to the initial prompt with adjusted settings applied to one or more inference parameters.

In one embodiment, comparison correction method 200 further generates the rectified responses without referring to an example template text. Comparison correction method 200 generates the rectified response where a reference text for the numeric comparison is unavailable. The comparison correction method thus detects inaccuracies reflected in the LLM response around numerical elements and comparisons between numeric values without constraining the LLM to mimicking a selected few reference texts.

In one embodiment, to generate an alternative prompt to the large language model that is configured to cause the large language model to correct the inaccuracy in a rectified response (discussed at block 225), comparison correction method 200 automatically determines actual values for the comparative relationship or difference which may be provided in the alternative prompt for replacement of inaccurate values. Thus, at block 225, comparison correction method 200 may further one or more of: (1) automatically determine an actual relationship between a pair of numbers compared in the numeric comparison; and (2) automatically determine an actual difference between the pair of numbers compared in the numeric comparison.

In one embodiment, following block 225 (or as part of block 225) comparison correction method 200 further presents the rectified response in a natural language user interface to a structured database.

In one embodiment, the comparison correction system 100 is configured to perform steps of a method for correcting numerical comparison errors in natural language output of an LLM, such as comparison correction method 200. The comparison correction method may include accessing structured data that is included in a prompt to an LLM. The comparison correction method may include intercepting an NL response by the LLM to the prompt. The comparison correction method may include detecting that the NL response contains numeric comparison inaccuracies. The comparison correction method may include generating an alternative prompt to the LLM that is configured to cause the LLM to correct the numeric comparison inaccuracies. And, the comparison correction method may include presenting a corrected or rectified natural language response by the LLM to the alternative prompt.

—Comparison Correction System—Example Use Case—

LLMs are now being used in a wide variety of use cases. One such use case for an LLM is representing structured data (such as tabular data) in natural language (NL). For example, converting structured data containing numbers to natural language is becoming a popular use case. This use case is often associated with code generation, SQL generation, or conversing in NL with a database.

For example, an NL user interface to a structured database may accept a question (or request) from a user: "Compare the revenue from account 1 in 2022 vs. 2023." This question is presented to a Text-to-SQL model. The Text-to-SQL model is a machine learning model that is configured to generate SQL code for queries that retrieve the requested information specified by NL input. The question is provided to the Text-to-SQL model. The Text-to-SQL model generates a query that is configured to retrieve the information in the question. The generated query is executed against a database that holds the information in the question. The database returns the data in a structured format, such as a tabular format. For example, an example tabular response by the database may be as shown in Table 1 below:

TABLE 1

| Year | Revenue |
| --- | --- |
| 2022 | 1849400 |
| 2023 | 374034 |

The structured (e.g., tabular) data returned by the database (shown in Table 1) may then be sent to an LLM, along with the user-input question, to cause the LLM to generate an NL response to the question. Here, the NL user interface acts as a client system of the comparison correction system. Illustrative examples of NL responses to the question that might be produced by the LLM are discussed below:

(A) "In 2022, the revenue was 1,849,400, and in 2023 the revenue increased to 374,034." Response (A) includes an incorrect comparison: 1,849,400 is not less than 374,034.

(B) "In 2022, the revenue was 1,849,400, which was 83,749 lower than the revenue produced in 2023 of 374,034." Response (B) includes an incorrect comparison: 1,849,400 is not less than 374,034, and the difference between these numbers is not 83,749.

(C) "The revenue of 1,849,400 was reported in 2022 and 2023." Response (C) includes an incorrect comparison: 2022 and 2023 revenue are not the same, and the response is missing 2023 revenue of 374,034.

(D) "The 2022 revenue was 1,849,400 and the 2023 revenue was 374,034." Response (D) is a correct response that does not include a comparison.

(E) "In 2022, the revenue was 1,849,400, and in 2023 the revenue decreased to 374,034." Response (E) is a correct response, and includes a correct comparison: 1,849,400 is greater than 374,034.

(F) "In 2022, the revenue was 1,849,400, and in 2023 the revenue decreased by 1,475,366 to 374,034." Response (F) is a correct response, and includes a correct comparison: 1,849,400 is greater than 374,034, and the difference between these numbers is 1,475,366.

—Comparison Correction System-Context and Discussion—

LLMs perform poorly at understanding numbers, statistical operations, and math operations. LLMs operate based on understanding words as text strings rather than as numbers and computations. LLMs do not perform the tasks of mathematical operations and statistical operations as such, and cannot be relied on to generate accurate results for these operations. LLMs tend to report unverifiable numbers in the NL response that are not present in or derived from source data. LLMs also tend to add details in the NL response that go beyond what is present in the structured data, leading to inaccurate responses.

An NL response may contain comparison between numbers, for instance, "amount x is larger than amount y." Even when the numbers reported are correct, a comparison between numbers (such as a number being smaller than, larger than, or equal to another number) is something LLMs generally struggle with. The LLM may be instructed in a prompt to double check the logic, and be provided with examples in the prompt on what correct number comparisons look like, but such prompt engineering approaches are not known to reliably rectify comparison errors. Numeric comparison errors commonly go undetected in NL responses even after extensive prompt-based instruction. Numeric comparisons in the NL response are thus often inaccurate. Employing LLM models with the foregoing shortcomings to perform tasks of NL interaction with numerical data is undesirable because the LLM may not represent the data accurately.

It is technically challenging to evaluate the NL response when the NL response contains comparisons between numbers. Existing methods for evaluating the quality of an LLM response (such as word- or embedding-based metrics or LLM-as-a-judge) do not provide a clear picture of problems with numeric comparison in a response. Existing methods for evaluating correctness of an NL response also require a reference text to compare against. Given that there can be many possible ways LLM can phrase a correct answer, alignment with a reference text is an inadequate and inaccurate measure of correctness of an NL response. Outside of the comparison correction methods presented herein, there is no known metric that captures correctness of a numeric comparison in an NL response. Accordingly, it is technically challenging to detect incorrect numeric comparisons in an NL response, and in turn to automatically correct the NL response.

In one embodiment a comparison correction system resolves this challenge by implementing (1) a mechanism to evaluate LLM responses with numbers as a post-processing step including detection of inaccuracies in LLM response followed by (2) rectification steps to generate a better LLM response. (The comparison correction method may occasionally be referred to herein as "relative numeric evaluation" or "RelativeNumEval.")

The comparison correction system detects LLM response inaccuracies with numbers and number comparisons (as discussed in further detail below). Once these issues are detected, a new prompt is sent to an LLM. The new prompt is configured to rectify the issue or completely regenerate a response. The new prompt includes (A) the previous inaccurate response and (B) the issues that were detected. The new response by the LLM to the new prompt is passed through the RelativeNumEval again, until the evaluation reports no issues. This loop is capped to run 3-4 times. In this way the RelativeNumEval rectifies issues around numbers and number comparisons by prompting the LLM to generate a new response with added knowledge of the issue type. The detection of the issues and development of additional information of the type of issue enables the subsequent rectification.

The comparison correction system described herein improves the technology of LLMs by enabling automated detection and correction of inaccurate numeric comparison in NL responses. For example, the comparison correction system (i) employs relative numeric evaluation techniques to detect incorrect numeric comparison in NL responses and (ii) automatically provides context about the erroneous comparison to the LLM to generate rectified or corrected NL responses. The comparison correction system may detect numeric data related inaccuracies—specifically relative comparisons between numbers—and operates to correct the issues post-detection in an automated fashion.

In testing, the comparison correction system shows a substantial improvement over high-performance LLMs in the particular task of detection and rectification of numeric comparison errors. For example, GPT4o and GPT4o-mini, when tested for detection and rectification of numeric comparison errors using only prompting techniques, successfully detected and corrected numeric comparison issues only for 62.5% of NL responses. By comparison, the comparison correction system yielded far greater accuracy in detection and correction of numeric comparison issues, even using a low-performance model. For example, for phind-codellama- 34b-v2—a model that is much smaller and lower-performance than GPT4o—the comparison correction system successfully detected and rectified the issue for 87.5% of NL responses. Without the comparison correction system, using only prompting techniques, phind-codellama-34b-v2 successfully detects and rectifies numeric comparison issues only 33.3% of the time. This is an over 160% improvement in successful detection and correction for the simple phind-codellama-34b-v2 model. This measurable improvement in comparison correction using simple LLMs is also applicable to complex LLMs such as GPT4o.

Further testing with more recent versions of GPT4o and GPT4o-mini continue to show improvement when applying the comparison correction system atop the LLM. For example, when using just a prompting technique for correction—e.g., prompting the LLM to confirm that a comparison is correct—GPT4o shows 79.2% successful detection and correction of errors in numeric comparison. Replacing the prompting technique with the comparison correction system for the complex GPT4o model increases the successful detection and correction rate to 83.3%, which is an improvement of over 4%. And, for GPT4o-mini, prompting techniques alone yield just 20.8% successful detection and correction of errors in numeric comparison. Replacing the prompting technique with the comparison correction system for the simple GPT4o-mini model also increases the successful detection and correction rate to 83.3%, which is a 300% improvement.

—Comparison Correction System-High-Level System Concept—

FIG. 3 illustrates one embodiment of a high-level system concept 300 using relative numerical evaluation for comparison correction which is associated with detection and correction of LLM responses that contain inaccurate numeric comparisons. High-level system concept 300 shows that, in one embodiment, the system design for comparison correction follows a two-phased approach. A first phase, phase 1 305, is for identification of issues with the numeric content of a NL response. A second phase, phase 2 310, is for rectification of the identified issues.

In one embodiment, inputs for the steps of phase 1 305 include (1) structured (e.g., tabular) data from which an NL response is produced by the LLM, and (2) the NL response itself. Phase 1 305 may produce detection outputs 315.

Detection outputs 315 include a content coverage score 320 that measures numeric coverage in the NL response with reference to numerical data present in the structured data. Content coverage score 320 indicates whether or to what extent numbers in the NL response come from the structured data. Content coverage score 320 may be generated by extracting numerical values from the NL response and verifying the presence of the extracted numerical values in the structured data. Content coverage score 320 thus detects when there are unverifiable numbers in the NL response. In one embodiment, content coverage score 320 may be a tally of unverifiable numbers present in the NL response. A content coverage score 320 in less than 1 indicates that rectification may be performed to ensure that the LLM does not insert numbers that are not in the structured data into the NL response that is meant to describe the structured data.

Detection outputs 315 include statuses for numeric comparison inaccuracies 325. These statuses include a relationship rectification status 330 that indicates whether there is a need to correct the type of relationship between two values (X and Y) expressed in the NL response. And, these statuses include difference rectification status 335 that indicates whether there is a need to correct a difference value (Z)

between two values (X and Y) expressed in the NL response. Phase 1 305 detects comparison inaccuracies 325 based on similarity between words indicating comparisons and words in the NL response. For example, Phase 1 305 may perform an analysis of the combined lexical and semantic similarity between words indicating comparisons and the words in the NL response. This analysis may use word strings as well as the numerical representations of the words and/or sentences as embeddings. If there is a high probability that terms present in the NL response are similar to words indicating comparisons, the comparison is then segregated into 3 categories: higher, equal, and less. The NL response comparisons are classified into these category buckets to indicate a type of comparison present. A machine learning classification model may be built as well to augment this categorization.

With the comparison category thus determined, phase 1 305 passes the NL response to an LLM to extract the numbers that are compared with that comparison category. For example, the LLM may be provided with the following prompt: "In the given text, X is higher than Y by Z. X=? Y=? Z=?" The LLM fills in the values for X, Y, and Z. The prompt is specifically designed based on the category detected in the previous step. The values for the X, Y, and Z variables are then converted to numeric (e.g., int) from strings.

The values for the X, Y, and Z variables are then mathematically checked for correctness. This validity check determines one or more of (2A) relationship rectification status 330 or (2B) difference rectification status 335. This evaluation helps ensure that an incorrect comparison is successfully detected so that corrective measures can be taken to re-generate a response (a rectified response) that rectifies the incorrect comparison. The comparison correction process may stop if no incorrect numbers (indicated by content coverage score 320) or incorrect comparisons (indicated by relationship rectification status 330 and difference rectification status 335) are detected. In such a case rectification is unnecessary.

The (1) content coverage score 320 helps verify that no new numbers are produced by the LLM that are not expected to be present based on the structured data. The (1) content coverage score 320 informs which numeric values may be the source of inaccuracy and need rectification, which corroborates any numeric difference values rectification as indicated by (2) evaluation for comparison inaccuracies 325. The (2) evaluation for comparison inaccuracies 325, including (2A) relationship rectification status 330 and (2B) difference rectification status 335, helps ensure that an incorrect comparison is successfully detected. Thus, these outputs show whether or not rectification of the response is indicated, and if so, classify the distinct types of rectification to be performed in phase 2 310.

If incorrect numbers or incorrect comparisons are detected, the comparison correction process will proceed to phase 2 310 for rectification of these issues. After detection of either unverifiable numbers (based on content coverage score 320) or comparison inaccuracies 325, corrective measures can be taken to re-generate a response without the detected issues. The NL response is passed back to the LLM to re-generate a corrected or rectified response based on issues identified by content coverage score 320 and comparison inaccuracies 325. This rectified natural language response is the correction output 340 of phase 2 310.

The correction output 340—the rectified NL response—is then returned to phase 1 305 to determine whether phase 2 310 has successfully corrected the issues, leaving no new issues in the rectified NL response to be identified by phase 1 305. In one embodiment, phase 1 305 and phase 2 310 are reiterated for a plurality of times until there is no further need for rectification. In one embodiment, prompt strategies that are distinct from each other are employed in individual iterations. For example, multiple passes are done through LLMs: one set of passes in attempt to correct an inaccurate NL response, and if that initial attempt fails, the next set of LLM passes to regenerate the response with different inference parameter settings (e.g., a changed temperature setting). The issue identification evaluations based on content coverage score 320, relationship rectification status 330, and difference rectification status 335 are conducted on the response produced by the LLM in iterations until the response produced by the LLM either (A) passes these issue identification checks, or (B) in rare cases, reaches a cap on repetitions that terminates further attempts at rectification. In one embodiment, reiteration through the phases 305, 310 is kept low, for example being repeated up to 3 or 4 times before determining that the NL response is not able to be rectified efficiently.

—Comparison Correction System-Phase 1: Issue Identification—

Figure 4:
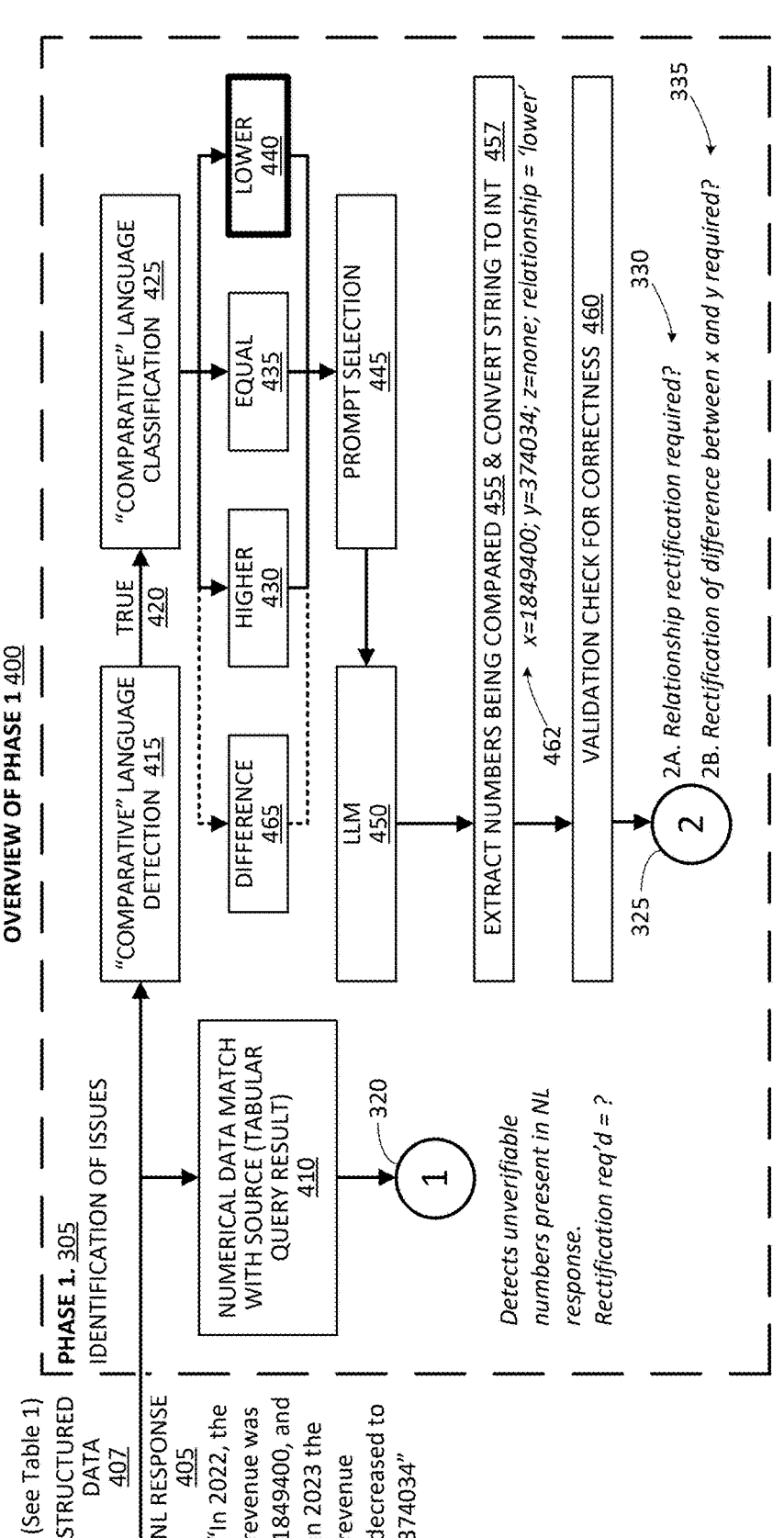
FIG. 4 illustrates an overview of phase 1 for identification of numeric comparison issues which is associated with detection and correction of LLM responses that contain inaccurate numeric comparisons.

FIG. 4 illustrates an overview 400 of phase 1 305 for identification of numeric comparison issues which is associated with detection and correction of LLM responses that contain inaccurate numeric comparisons. The comparison correction system takes as input (A) the structured (tabular) data 407 resulting from the query and (B) an NL response 405 to the structured data generated by the LLM. For example, the comparison correction system (A) captures the structured data 407 that was produced by execution of a query on a database; and (B) intercepts an initial NL response 405 by the LLM to an initial prompt that includes the structured data 407. In the example of overview 400, the NL response 405 is example Response E "In 2022, the revenue was 1,849,400, and in 2023 the revenue decreased to 374,034", and the structured data 407 is as shown in Table 1 (under the heading "Comparison Correction System—Example Use Case").

In one embodiment, phase 1 305 includes an initial check to verify numerical data match 410 with the source numerical data. Numerical data match 410 confirms that the generated numerical data included in the NL response 405 are present in the source numerical data (in structured data 407) included in the initial prompt to the LLM. In numerical data match 410, comparison correction system (i) accesses the structured data 407 and extracts the source numerical data from structured data 407, and (ii) accesses the NL response 405 and extracts the generated numerical data from the NL response 405. The comparison correction system then compares the individual values in the source numerical data and generated numerical data to determine whether there are matches for the generated numerical data. Numbers in the generated numerical data that have matches in the source numerical data are verified numbers. Numbers in the generated numerical data that lack matches in the source numerical data are unverified numbers. In one embodiment, a count of unverified numbers is produced as content coverage score 320.

In one embodiment, phase 1 305 includes comparative language detection 415. To identify issues with numeric comparisons, phase 1 305 performs a combination of lexical and semantic similarity analyses between (A) words and/or phrases that are considered comparative and (B) words and/or phrases in the NL response 405. The analyses may be performed using word strings as well as numerical representations of the words/phases as embeddings. For example, character strings from the NL response 405 may be compared with the character strings of words in a predetermined list of comparative words. In this way, the comparison correction system may detect—based on matched strings—comparative language in the NL response 405. Or, for example, embeddings of words from the NL response 405 may be compared with embeddings of words in the list of words considered to indicate comparisons. In this way, the comparison correction system may detect—based on cosine similarity, Euclidean distance, or other measure of semantic similarity—comparative language in the NL response 405. In the case of example Response E, comparative language detection 415 detects "decreased" to be comparative.

Where comparative language is detected (true 420) phase 1 305 proceeds to comparative language classification 425. If comparative words show a high probability of being present in the NL response 405, the comparison is then segregated into three categories of relationship: higher 430, equal 435, or lower 440. The comparisons are split into these buckets to indicate the category of the comparison between X and Y. (In one embodiment, relationships higher 430, equal 435 and lower 440 could further include additional types of comparative relationship such as absolute numeric difference between numbers, percentage increase/decrease, fraction increase/decrease, or other categories. In other words, the comparison correction system classifies the numeric comparison as a relationship between a first number X and a second number Y that is one of (i) "higher than," (ii) "equal to," or (iii) "lower than" based on the language detected in comparative language detection 415.

The classification may be performed by lexical analysis that compares the comparative language to pre-determined lists of words assigned to three categories to find a category that has a match to the comparative language. Or, the classification may be performed by semantic analysis that measures semantic similarity between embeddings of the comparative language and the three categories to find a matching category. The classification may also be performed by training a machine learning model.

These three categories may be Boolean such that: (A) where language indicating a particular category of relationship is detected in the NL response 405, comparative language classification 425 sets the status of the category that corresponds to the particular relationship to "true;" and (B) where language indicating a particular relationship is NOT detected, comparative language classification 425 sets the status of the category that corresponds to the particular relationship to "false." In the case of the given example Response E, the comparative language classification 425 determines the word "decreased" to indicate a relationship between X and Y that is lower 440.

In one embodiment, comparative language detection 415 and comparative language classification 425 may be performed by an LLM, such as LLM 450, or another, LLM dedicated to the task. For example, the classification may be made by zero shot classification, in which the NL response and the three categories higher 430, equal 435, and lower 440 are provided in a prompt to the LLM to cause it to make the detection and classification. In another example, the prompt might be "In the given text, please determine whether there is a comparison between two numbers, and if so, classify the comparison as one of a higher, equal, or lower relationship between the two numbers," followed by the NL response 405.

While the LLM herein may referred to herein as a single LLM for convenience, a plurality of LLMs may also be used. For example, individual LLMs may be associated with and trained or fine-tuned for performing particular tasks. A first LLM might be used to (re) generate NL responses to describe the structured data, a second LLM might be used to extract numbers from the NL response, and a third LLM might be used to detect and classify comparative language.

With the comparison category known, the comparison correction system may perform a prompt selection 445 to choose a prompt that is configured to cause an LLM to extract the first and second numbers being compared from the NL response 405. For example, the prompt might be "In the given text, X is higher than Y. X=? Y=?", followed by the text of the NL response 405. The prompt is specifically designed based on the category detected in the previous step of comparative language classification 425. In this way, the prompt corresponds to the relationship. In the case of the given example Response E in which the relationship is lower 440, the prompt selection 445 may choose a prompt such as "In the given text, Y is lower than X. X=? Y=?", followed by example Response E.

The comparison correction system passes the NL response 405 to an LLM 450 using the chosen prompt. In other words, the comparison correction system submits to the LLM 450 a prompt that corresponds to the relationship. In response to the submitted prompt, LLM 450 operates to extract the numbers that are being compared with the detected comparison category. The LLM returns the number associated with X and the number associated with Y in response to the prompt. (Alternatively, the numbers X and Y may be extracted using one or more regular expressions). In this way, the LLM fills the values for X and Y. Comparison correction system then converts string to numeric 457 (such as integer, float, or double) for the values assigned to X and Y. These values are retained for population of mathematical expressions in a validation check for correctness 460. In the case of example Response E, the extracted values 462 for X, Y, and the relationship are X=1849400, Y=374034, and relationship=lower 440. (There is no difference value Z (discussed below) in the case of Example E.)

Comparison correction system then performs a validation check for correctness 460 on the values of X and Y. In one embodiment, validation check for correctness 460 is a Boolean check on a mathematical expression of the numeric comparison detected in the NL response 405. For example, the comparison correction system populates a mathematical expression of the numeric comparison with the first number X, relationship, and the second number Y, and then evaluates the truth (or falsehood) of the expression assembled from these parts. Where the expression is true, the numerical comparison is correct, and (2A) relationship rectification status 330 indicates that no rectification of a relationship between numerical values X and Y is needed. Where the expression is false, the numerical comparison is incorrect, and (2A) relationship rectification status 330 indicates that rectification of a relationship between numerical values X and Y is needed. This evaluation helps ensure an incorrect comparison is successfully detected, after which corrective measures can be taken to re-generate a response that does not have the detected issues. The process stops if no numeric comparison issue is detected in any of the steps above, in which case rectification is not indicated.

In one embodiment, comparative language detection 415 detects words or sentence structures in the NL response 405 that are indicative of a difference 465 between two numbers to be part of the comparative language. Comparative language classification 425 then detects that the NL response 405 includes a difference value Z between first number X and second number Y, and applies an additional category of difference 465 to the comparative language. This category may be Boolean such that: (A) where difference language is detected, comparative language classification 425 sets the status of the category to "true;" and (B) where difference language is NOT detected, comparative language classification 425 sets the status of the category to "false."

Prompt selection 445 accesses the status of difference 465 when choosing a prompt to cause the LLM 450 to extract values from the NL response 405. Where difference 465 is false (indicating that no difference has been detected), prompt selection chooses a prompt that does not seek to extract the difference value Z, as discussed above. Where difference 465 is true (indicating that a difference has been detected), prompt selection 445 chooses a prompt that is further configured to cause the LLM 450 to extract the difference value Z from the NL response 405 in addition to first number X and second number Y. For example, the prompt might be "In the given text, X is higher than Y by an amount Z. X=? Y=? Z=?", followed by the text of the NL response 405.

As an example, let NL response 405 be example Response F, "In 2022, the revenue was 1,849,400, and in 2023 the revenue decreased by 1,475,366 to 374,034", and the structured data 407 be as shown in Table 1 (as discussed above under the heading "Comparison Correction System—Example Use Case"). Comparative language detection 415 detects the phrase "decreased by" to indicate comparative language. Comparative language classification 425 categorizes the relationship as being lower 440 based on the "decreased" in "decreased by," and also sets difference 465 to be true, based at least on the "by" in "decreased by." In the case of example Response F in which the relationship is lower 440 and a difference is expressed, prompt selection 445 may choose a prompt such as "In the given text, Y is lower than X by an amount Z. X=? Y=? Z=?", followed by the text of example Response F.

The comparison correction system passes the NL response 405 (here, example Response F) to the LLM 450 using the chosen prompt that corresponds to the relationship and to the difference status. In response to the submitted prompt, LLM 450 operates to extract the numbers that are being compared with the detected comparison category and difference status. The LLM returns the number associated with X, the number associated with Y, and the number associated with Z in response to the prompt. (Alternatively, the numbers X, Y, and Z may be extracted using one or more regular expressions). Comparison correction system then converts string to numeric 457 for X, Y, and Z. In the case of example Response F, the extracted values for X, Y, Z, and the relationship are X=1849400, Y=374034, Z=1475366 and relationship=lower 440.

Comparison correction system then performs a validation check for correctness 460 on the values of X, Y, and Z. For example, the comparison correction system populates an equation with the first number X, relationship, the second number Y, and the difference value Z. In this example, where the relationship expressed is a quantity by which X and Y differ, the equation is a difference equation that expresses subtracting the second number Y from the first number X to equal Z (X−Y=Z). Comparison correction system then evaluates the truth (or falsehood) of the equation assembled from X, Y, and Z. Where the equation is true, the difference value Z is correct, and (2B) difference rectification status 335 indicates that no rectification of a difference value Z between numerical values X and Y is needed. Where the equation is false, the difference value Z is incorrect, and (2B)

difference rectification status 335 indicates that rectification of a difference value Z between numerical values X and Y is needed. This is further corroborated by (1) indication Z as an unverifiable number.

Together, comparative language detection 415, comparative language classification 425 into higher 430, equal 435, and lower 440 categories, prompt selection 445, LLM 450 number extraction and conversion to integers 455, difference 465, and mathematical validation check for correctness 460 operate to detect whether the initial NL response 405 contains an inaccuracy in a numeric comparison, based on validation check for correctness 460.

—Comparison Correction System-Phase 2: Issue Rectification—

Figure 5:
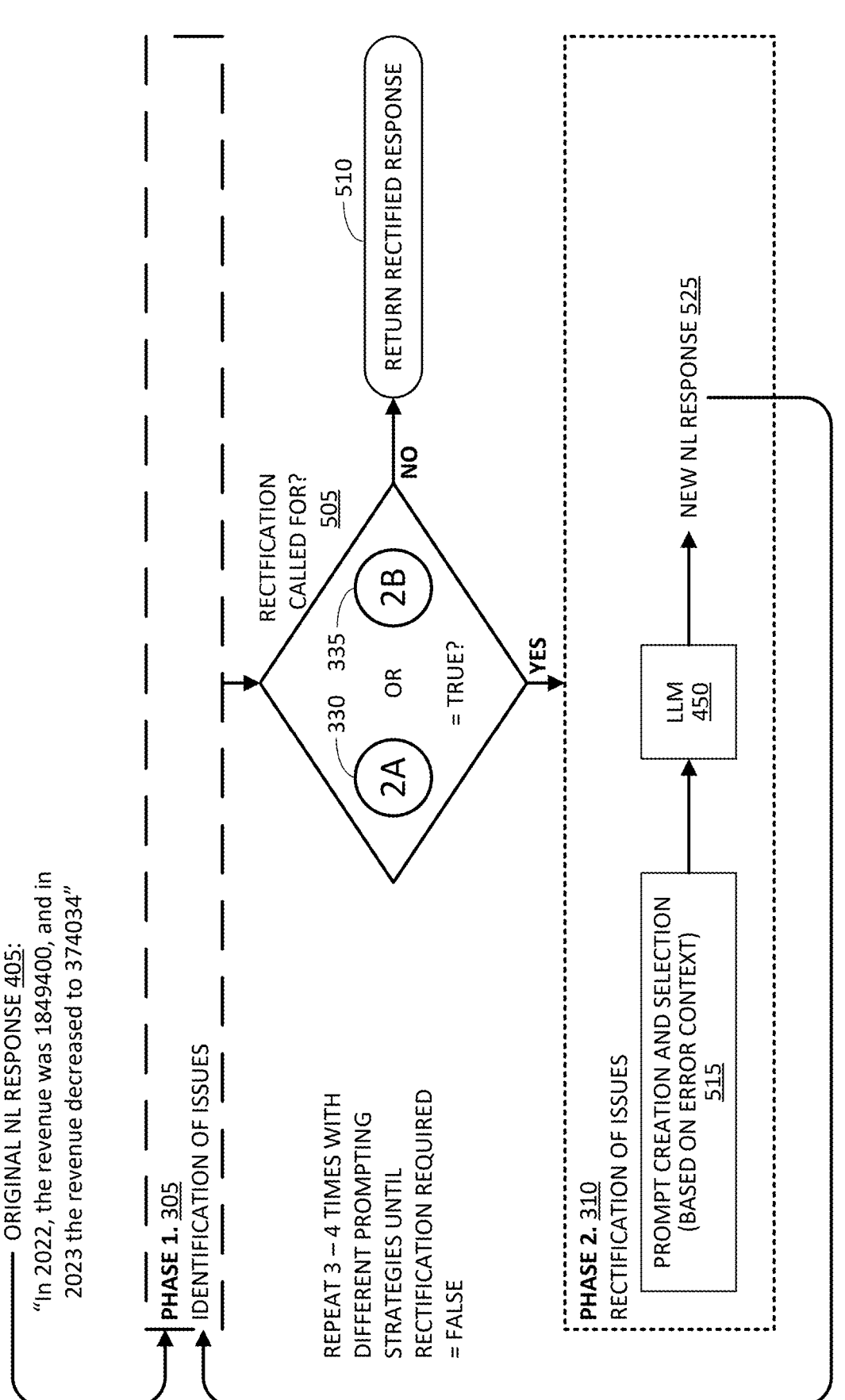
FIG. 5 illustrates an overview of phase 2 for rectification of numeric comparison issues which is associated with detection and correction of LLM responses that contain inaccurate numeric comparisons.

FIG. 5 illustrates an overview 500 of phase 2 310 for rectification of numeric comparison issues which is associated with detection and correction of LLM responses that contain inaccurate numeric comparisons. In phase 2 310, the NL response 405 is passed back to the LLM to generate a corrected or rectified response based on issues identified in phase 1 305. Multiple passes are done through prompting the LLM for rectified responses in phase 2 310 and returning to phase 1 305 to check whether the issues are resolved. The reiteration through multiple passes either: (A) stops after a cap (e.g., 3-5 tries) is reached, or (B) continues until the new NL response passed the 'identification of issues' step, whichever occurs first. One set of passes through the LLM are an attempt to correct an inaccurate NL response by passing in the error information as context. If the attempt fails, the next set of LLM passes is to regenerate the response with different inference parameter settings (e.g. changed temperature setting). The 'identification of issues' steps of phase 1 305 are conducted until the response produced by the LLM in phase 2 310 passes these phase 1 305 evaluations.

At the completion of phase 1 305, the comparison correction system checks whether rectification is called for 505. If either of (2A) relationship rectification status 330 or (2B) difference rectification status 335 is true (550: YES), rectification of some sort is needed, and the comparison correction system proceeds to phase 2 310. The content coverage score 320 (1) corroborates unverifiable numbers that may need rectification, as determined by difference rectification status 335 (2B). If neither of (2A) relationship rectification status 330 or (2B) difference rectification status 335 is true (550: NO), no further rectification is needed, and the comparison correction system proceeds to return the rectified response 510 in its current state.

Thus, for example, the check for unverifiable numbers by content coverage scoring at (1) act as a confirmation that rectification may be needed, and further verifying that the numbers in need of correction are being rectified by the comparison correction system. For example, take an LLM-generated statement, "In 2020, the revenue was X, which was Z more than 2021's revenue of Y." In this example, Y is found to be unverifiable—and X and Z are found to be verifiable—by content coverage analysis (1). In this case, the rectification step ensures that it is not trying to replace X or Z in the corrected response, and is instead calculating a correct value for Y, replacing Y with the correct value, and assessing rectification of the relationship between X, Y, and Z accordingly. It is possible that an unverifiable number is accurate in terms of the calculation that the unverifiable number represents, in which case difference rectification analysis (2B) determines that no rectification is called for.

In phase 2 310, the comparison correction system performs a process for prompt creation and selection 515, followed by submission of the created prompt to the LLM 450 to obtain a new (rectified) NL response 525. The new NL response 525 is then returned to phase 1 305 (as the input NL response 405) for evaluation as to whether the issues are resolved in the new NL response 525.

In prompt creation and selection 515, the comparison correction system generates an alternative prompt to the LLM. The alternative prompt is configured to cause the LLM to correct the inaccuracy in a rectified response. The alternative prompt may include the NL response 405, a specific statement of the issue(s) with the NL response 405, and information that corrects the issues. Illustrative example issue cases and corresponding example alternative prompt templates follow:

(1) Where the comparison inaccuracies 325 include a (2A) relationship rectification status 330 of TRUE and a (2B) difference rectification status 335 of TRUE, the prompt might be "The given text describing the given data includes two errors. The first error is that [X] is not [relationship] [Y]. [X] is actually [actual_relationship] [Y]. The second error is that the difference between [X] and [Y] is not [Z]. The difference between [X] and [Y] is actually [actual_Z]. Revise the given text (1) to state the actual relationship of [X] and [Y] and (2) state the actual difference between [X] and [Y]." followed by the text of the NL response 405 and the structured data 407.

(2) Where the comparison inaccuracies 325 include a (2A) relationship rectification status 330 of TRUE and a (2B) difference rectification status 335 of FALSE, the prompt might be "The given text describing the given data includes an error. [X] is not [relationship] [Y]. [X] is actually [actual_relationship] [Y]. Revise the given text to state the actual relationship of [X] and [Y]." followed by the text of the NL response 405 and the structured data 407.

(3) Where the comparison inaccuracies 325 include a (2A) relationship rectification status 330 of FALSE and a (2B) difference rectification status 335 of TRUE, the prompt might be "The given text describing the given data includes an error. The difference between [X] and [Y] is not [Z]. The difference between [X] and [Y] is actually [actual_Z]. Revise the given text to state the actual difference between [X] and [Y]." followed by the text of the NL response 405 and the structured data 407.

(4) Where the comparison inaccuracies 325 include a (2A) relationship rectification status 330 of false and a (2B) difference rectification status 335 of false, no further prompting will be performed. There are no numeric comparison issues detected, and the NL response has been rectified.

Items in brackets are variables that are replaced in the template prompts at runtime with corresponding values.

In one embodiment, the prompt creation and selection 515 computes the actual relationship and actual value of Z to include in the prompts above. To generate the actual_relationship and the actual_Z, the comparison correction system subtracts the values of X and Y. For example, the comparison correction system may use the arithmetic circuits of the processor to perform the subtraction X-Y to obtain a result. Where the result is positive, the actual_relationship is set to "greater than." Where the result is 0, the actual_relationship is set to "equal to" Where the result is negative, the actual_relationship is set to "less than." The actual_Z is set to the magnitude (absolute value) of subtractive difference X-Y. When the result is positive and the actual_relationship is "greater than", representing "% greater than", then actual_Z is set to the percentage difference of $100*(X-Y)/Y$.

Phase 2 310 then submits the alternative prompt to the LLM 450 to cause the LLM 450 to generate a new NL response 525. The new NL response 525 is returned as input to phase 1 305. The comparison correction system then uses this new NL response 525 from a prior iteration as the initial NL response 405 for a new iteration to determine whether (1) the new NL response is successfully rectified to contain no further comparison inaccuracies 325, or (2) a further iteration of rectification in phase 2 310 is needed to correct comparison inaccuracies 325. The comparison correction system thus repeats the cycle of detecting that the response contains an inaccuracy in phase 1 305 and generating an alternative prompt and new (rectified) NL response 525 in phase 2 310 until either (A) no further inaccuracy is detected, or (B) a threshold for number of iterations is satisfied (e.g., until a cap C on iterations—such as 3 or 4 iterations—is reached).

In one embodiment, the comparison correction system tracks the number of iterations c that have been performed. From iteration to iteration the comparison correction system may vary or rotate through a plurality of prompt strategies when generating the alternative prompt. These and other prompt strategies may be varied from iteration to iteration, and used individually or in combination with each other, to give the LLM various ways to arrive at a correct comparison in the new NL response.

Some prompt strategies include using selecting from among distinct sets of template prompts during different iterations through phase 2 310. One prompt strategy may be to select and populate a prompt template that is configured to present context information about the inaccuracy to the LLM and instruct the LLM to correct the inaccuracy (such as example prompts 1, 2, and 3 above). Another prompt strategy may be to select and populate an alternate prompt template which is configured to present context information about the inaccuracy to the LLM and instruct the LLM to correct the inaccuracy using language distinct from that used in a prior iteration. Another prompt strategy may be to vary terms in the prompt using synonyms that change from iteration to iteration.

Other prompt strategies may include applying adjusted settings to one or more inference parameters when responding to the prompts. Another prompt strategy may be to adjust a hyperparameter for temperature to apply when generating the new NL response from a prompt so as to change the randomness of the words selected for the new NL response. Another prompt strategy may be to adjust a hyperparameter for sampling to apply when generating the new NL response from a prompt, for example a top-k sampling hyperparameter to constrain the LLMs choices to the k likeliest next words, or a top-p sampling hyperparameter to constrain the LLMs choices to a smallest set of words with a cumulative probability above a threshold p. Another prompt strategy may be to adjust a hyperparameter for beam width to apply when generating the new NL response from a prompt so as to change the number of candidate words to keep at individual steps of generating the new NL response.

Still other prompt strategies include prompt engineering. For example, another prompt strategy may be to specify a style, tone, role, or task for the LLM in responding to the prompt, for example, "In the revised text, describe the given data in a formal business tone," or "Act as an accountant when describing the given data in the revised text."

—Comparison Correction System—Example Walk-through—

Figure 6:
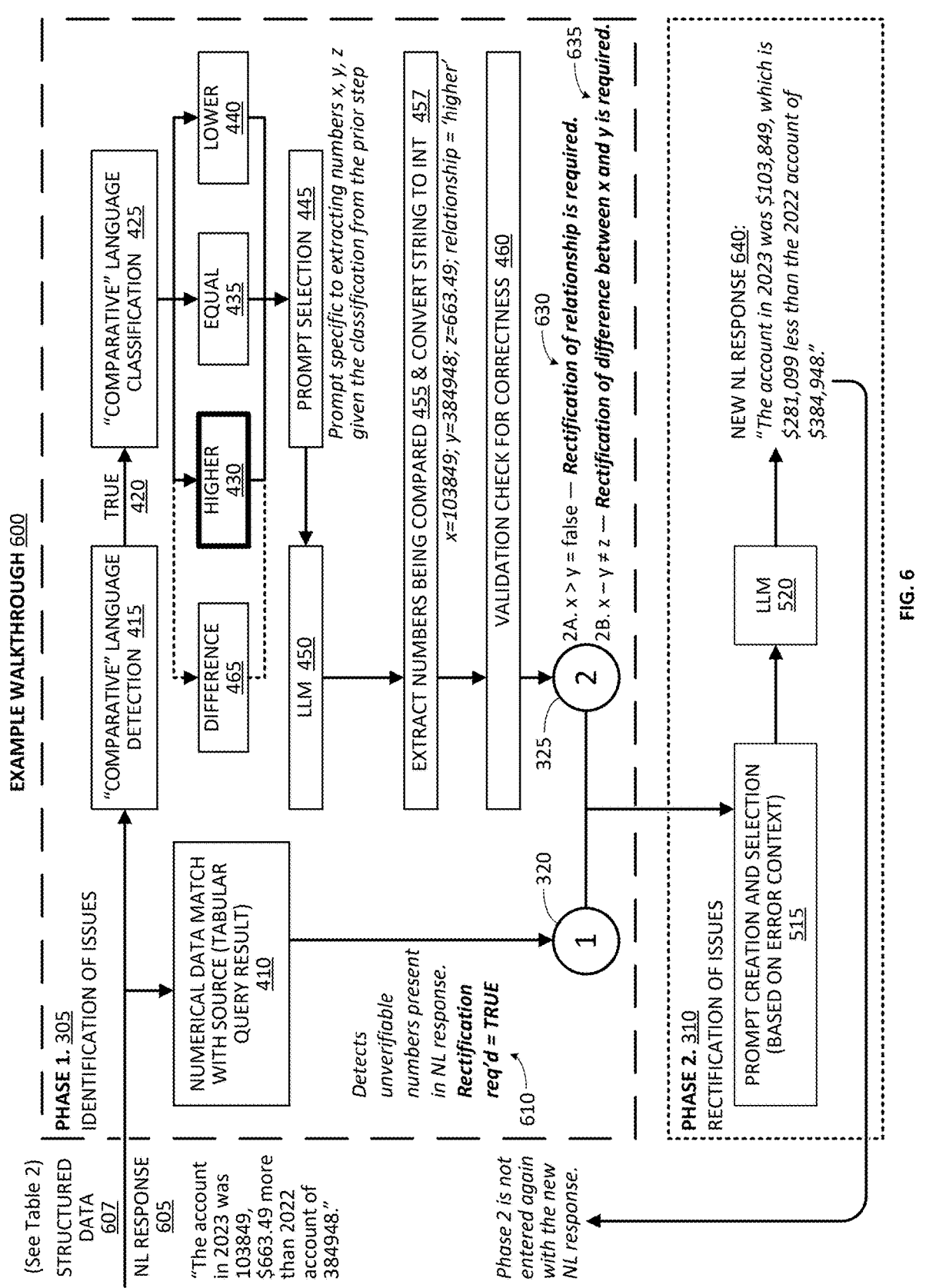
FIG. 6 illustrates an example walkthrough of phase 1 and phase 2 of a comparison correction process that is associated with detection and correction of LLM responses that contain inaccurate numeric comparisons.

FIG. 6 illustrates an example walkthrough 600 of phase 1 305 and phase 2 310 of a comparison correction process that is associated with detection and correction of LLM responses that contain inaccurate numeric comparisons. Another example of structured data 607 retrieved from a database may be as shown in Table 2 below:

TABLE 2

| Year | Revenue |
|------|---------|
| 2022 | 384948 |
| 2023 | 103849 |

The LLM has been provided a prompt, that includes the data of table 2 and instructions to "Compare the revenue from account 2 in 2022 vs. 2023." In response the LLM produces the following NL response 605, "The account in 2023 was 103849, $663.49 more than 2022 account of 384948." This response is an incorrect response. The response includes an incorrect comparison: 103849 is not higher than 384948. The response includes an incorrect difference: |103849–384948| is not $663.49.

Phase 1 305 provides NL response 605 and structured data 607 to numerical data match 410 with source. Numerical data match 410 with source detects that $663.49 is not present in the structured data 607. Rectification is needed 610.

Phase 1 305 provides NL response 605 to comparative language detection 415. Comparative language detection 415 detects that there is comparative language in NL response 605 (420: TRUE) based at least in part on the words "$663.49 more than."

Phase 1 305 then provides NL response 605 to comparative language classification 425. Comparative language classification 425 determines that the comparative language in NL response 605 is a higher 430 relationship based at least in part on the words "$663.49 more than." Additionally, comparative language classification 425 determines that the comparative language in NL response 605 includes a difference 465 based at least in part on the phrase "$663.49 more than."

Phase 1 305 then proceeds to prompt selection 445. Because the relationship is higher 430, prompt selection 445 selects an extraction prompt that is configured to extract values X and Y in a relationship that describes X as being greater than Y. Because there is a difference 465, prompt selection 445 selects an extraction prompt that is also configured to extract the value of the difference Z.

Phase 1 305 submits the selected extraction prompt and NL response 605 to LLM 450 to cause the LLM 450 to return X=103849, Y=384948, and Z=663.49. These values are converted from string to numeric 457 format.

Phase 1 305 then performs a validation check for correctness 460. To check whether the relationship is correct, validation check for correctness 460 populates the logical statement [X] [relationship] [Y], yielding the logical statement 103849>384948, and then determines that this statement is FALSE, indicating that rectification of relationship 630 is needed. To check whether the difference is correct, validation check for correctness 460 populates the mathematical statement [X]−[Y]|=[Z], yielding the mathematical statement |103849–384948|=663.49, and then determines that this statement is FALSE, indicating that rectification of difference 635 is needed.

The comparison correction process proceeds to phase 2 310 to rectify the incorrect relationship and incorrect difference. Prompt creation and selection 515 generates a new prompt to be provided to the LLM 520. Prompt creation and selection 515 looks up and accesses a template that is labeled for use when both rectification of comparison 630 and rectification of differences 635 are indicated, such as example prompt 1 described above. Prompt creation and selection 515 calculates an actual value for Z by determining the magnitude of the difference between X=103849 and Y=384948 (actual_Z=|X−Y|=|103849–384948|=281099). Prompt creation and selection determines the actual relationship to be a less-than relationship because the difference between X and Y is negative, −281099.

Prompt creation and selection 515 populates the template prompt with the values of X, Y, Z, actual_Z, the relationship, and the actual relationship, for example as follows:

"The given text describing the given data includes two errors. The first error is that 103849 is not greater than 384948. 103849 is actually less than 384948. The second error is that the difference between 103849 and 384948 is not 663.49. The difference between 103849 and 384948 is actually 281099. Revise the given text (1) to state the actual relationship of 103849 and 384948 and (2) state the actual difference between 103849 and 384948."

Phase 2 310 submits this new (alternative) prompt to LLM 520 along with the initial NL response 605 and the structured data 607. The LLM 520 generates the new NL response 640, "The account in 2023 was 103849, which is 281099 less than the 2022 account of 384948." Phase 2 310 captures the new NL response 640, and returns it to phase 1 305 to determine whether the incorrect relationship and incorrect difference issues have been corrected in the new NL response 640.

In one embodiment, Phase 2 310 tracks a count c of competed iterations through the pair of phase 1 305 and phase 2 310. In example walkthrough 600, c=0, because it is a first iteration. For other, higher values of k, $0 < c \leq C$, the prompt creation and selection 515 rotates through prompt strategies. Here, because new NL response 640 is correct, it will not re-enter phase 2 310.

—Comparison Correction System—Example Re-Tries—

FIG. 7 illustrates an example with re-tries 700 of a comparison correction process that is associated with detection and correction of LLM responses that contain inaccurate numeric comparisons. In some cases, the comparison correction process might not eliminate all issues of incorrect relationship and difference in a single pass-through phase 1 305 and phase 2 310. After phase 2 310 completes, the comparison correction process re-enters phase 1 305, and analyzes the new (rectified) NL response for correctness. Where there is no incorrect relationship (relationship rectification status 330=FALSE) and no incorrect difference (difference rectification status 335=FALSE), iteration terminates and the newly-generated, rectified NL response is returned. In example with re-tries 700, the comparison correction system iterates through phases 1 305 and 2 310 until the relationships and differences in the NL response are correct.

Initially, the LLM returns initial NL response 705. Initial NL response 705 states "2023 revenue was 103849, same as the 2022 revenue of 384948." The comparison correction system enters a first (c=0) iteration through issue identification phase 1 305 and issue rectification phase 2 305. A first iteration of phase 1 710 identifies an issue 712 in NL response 705:103849 is not equal to 384948. This is a relationship inaccuracy (comparison inaccuracies 330=TRUE) and therefore relationship correction is needed for initial NL response 705. (There are no differences stated in initial NL response 705, so difference inaccuracies 335=FALSE, and no correction of differences is needed for initial NL response 705.) The comparison correction system enters a first iteration of phase 2 715 that generates a first alternative prompt (such as by populating example template 2 above), and then passes the first alternative prompt, NL response 705, and structured data 607 to the LLM for generation of a new ($2^{nd}$) NL response 720.

New NL response 720 states "In 2023, revenue was 103,849, which is higher than the 2022 revenue of 384,948." The comparison correction system enters a second (c=1) iteration through phase 1 305 and phase 2 305. A second iteration of phase 1 725 identifies an issue 727 in new NL response 720:103849 is not greater than 384948. This is a relationship inaccuracy alone (comparison inaccuracies 330=TRUE, difference inaccuracies 335=FALSE) and therefore relationship correction is indicated for new NL response 720. The comparison correction system enters a second iteration of phase 2 730 that generates a second alternative prompt and passes the second alternative prompt, new NL response 720, and structured data 607 to the LLM for generation of a new ($3^{rd}$) NL response 735. Because now c=1 completed iterations, the prompt strategy may be incremented, for example by adjusting the temperature hyperparameter downward to decrease randomness.

New NL response 735 states "In 2023, revenue was 103,849, which is lower than the 2022 revenue of 384,948." The comparison correction system enters a third (c=2) iteration through phase 1 305. Third iteration of phase 1 740 identifies no issues 742 in new NL response 735:103849 is less than 384948. This is an accurate statement of the relationship between these two numbers (comparison inaccuracies 330=FALSE), and there are no differences stated (difference inaccuracies 335=FALSE). No correction of differences is indicated for new NL response 735. The loop of issue identification and correction ends and will not enter a third iteration of phase 2 310. The comparison correction system returns new NL response 735 as the response of the LLM to the initial prompt, in place of initial NL response 735.

—Example Improvements and Advantages—

As discussed above, existing methods of detecting inaccuracies in numeric comparisons are unsatisfactory at least because they are not sufficiently accurate. In one embodiment, the comparison correction system improves the technology of LLMs by providing automated evaluation and correction of numeric comparison inaccuracies (and other numeric content inaccuracies) in LLM responses. For example, in experimentation on one embodiment reduced to practice, the comparison correction system rectified 87.5% of samples, opposed to 62.5% of samples by GPT4o and GPT4o-mini without the comparison correction system.

Also, existing methods cannot automatically generate context about inaccurate numeric comparison that enables automatic correction of the inaccuracy, rendering existing correction processes not practical or scalable solutions to correcting comparisons in LLM output. In one embodiment, the comparison correction system improves the technology of LLMs by automatically extracting information about the inaccuracy from the NL response itself and generating actual description of the comparison, thereby enabling automatic rectification of numeric comparisons.

Further, existing methods rely on a ground truth NL reference text to rectify comparison errors, which unsatisfactorily constrains the NL response to mimic the reference text. In one embodiment, the comparison correction system improves the technology of LLMs because it directly uses database tabular results and a NL response generated from the database tabular results to identify and rectify issues, to rectify numeric comparison errors in an absence of any ground truth NL reference response.

—Cloud or Enterprise Embodiments—

In one embodiment, the present system (such as comparison correction system 100) is a computing/data processing system including a computing application or collection of distributed computing applications for access and use by other client computing devices that communicate with the present system over a network. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, comparison correction system 100 is a centralized server-side application that provides at least the functions disclosed herein and that is accessed by many users by way of computing devices/terminals communicating with the computers of comparison correction system 100 (functioning as one or more servers) over a computer network. In one embodiment comparison correction system 100 may be implemented by a server or other computing device configured with hardware and software to implement the functions and features described herein.

In one embodiment, the components of comparison correction system 100 may be implemented as sets of one or more software modules executed by one or more computing devices specially configured for such execution. In one embodiment, the components of comparison correction system 100 are implemented on one or more hardware computing devices or hosts interconnected by a data network. For example, the components of comparison correction system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of comparison correction system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of comparison correction system 100 may (i) generate or compose an electronic message or signal to issue a command or request to another component, (ii) transmit the message or signal to other components of comparison correction system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by comparison correction system 100, for example through a web interface server. In one embodiment, the remote computing system may send requests to and receive responses from comparison correction system 100. In one example, the access may be effected through use of a web browser on a personal computer or mobile device. In one example, communications exchanged with comparison correction system 100 may take the form of remote representational state transfer (REST) requests using JavaScript object notation (JSON) as the data interchange format for example. The REST requests may include API calls to components of comparison correction system 100.

—Software Module Embodiments—

In general, software instructions are designed to be executed by one or more suitably programmed processors accessing memory. Software instructions may be written in, for example, computer-executable code, source code that may be compiled into computer-executable code, and script code that may be interpreted for execution.

In a complex system, such instructions may be arranged into program modules with each such module performing a specific task, process, function, or operation. The set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein. In one embodiment, non-transitory computer-readable media may include stored thereon computer-executable instructions for performing the modules or the functions or logic described herein.

—Computing Device Embodiment—

Figure 8:
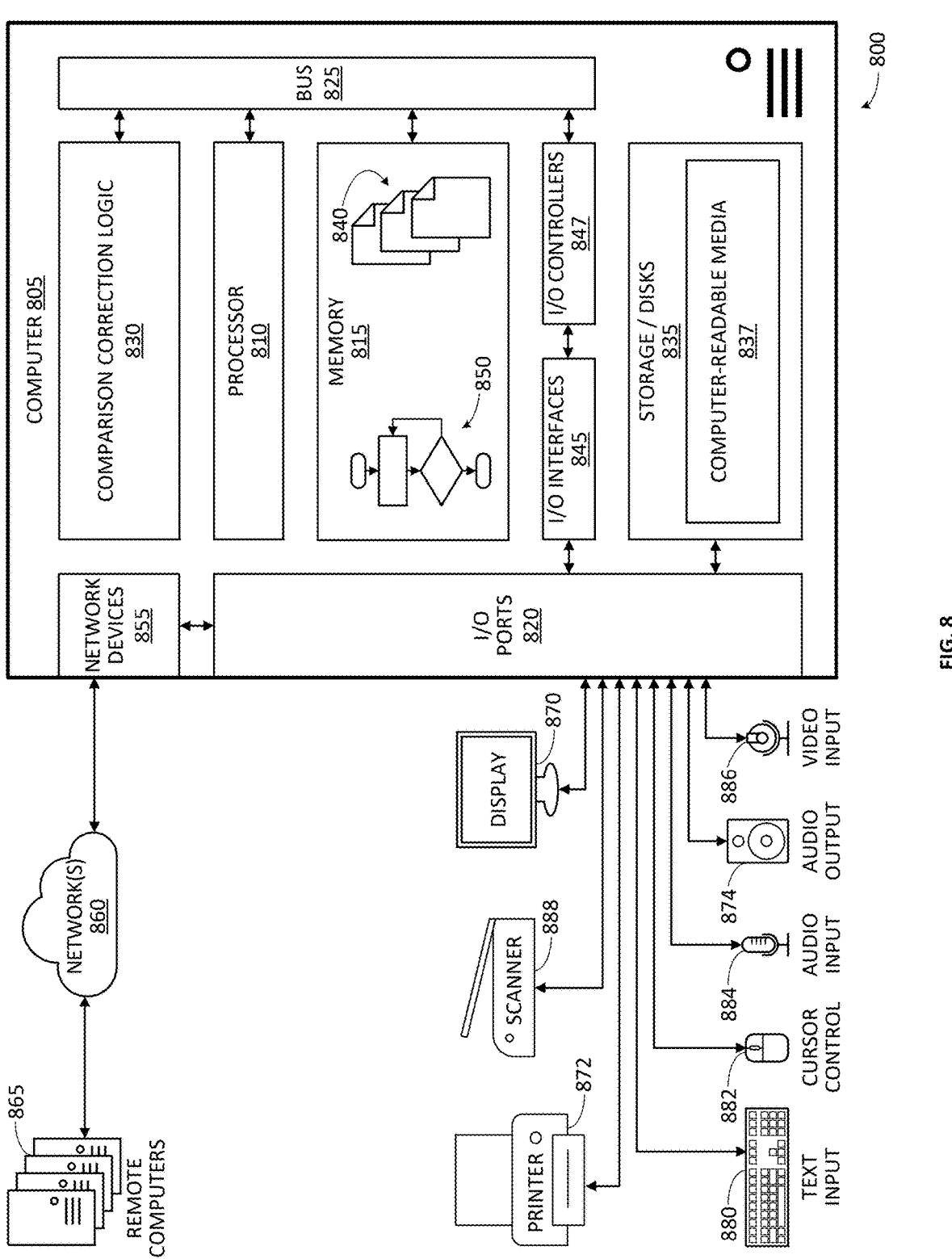
FIG. 8 illustrates an embodiment of a computing system configured with the example systems and/or methods disclosed.

FIG. 8 illustrates an example computing system 800 that is configured and/or programmed as a special purpose computing device(s) with one or more of the example systems and methods described herein, and/or equivalents. The example computing device may be a computer 805 that includes at least one hardware processor 810, a memory 815, and input/output ports 820 operably connected by a bus 825. In one example, the computer 805 may include comparison correction logic 830 configured to facilitate detection and correction of LLM responses that contain inaccurate numeric comparisons, similar to the logic, system, method, techniques, and other embodiments shown in and described with reference to FIGS. 1-7.

In different examples, the logic 830 may be implemented in hardware, one or more non-transitory computer-readable media 837 with stored instructions, firmware, and/or combinations thereof. While the logic 830 is illustrated as a hardware component attached to the bus 825, it is to be appreciated that in other embodiments, the logic 830 could be implemented in the processor 810, stored in memory 815, or stored in disk 835.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate detection and correction of LLM responses that contain inaccurate numeric comparisons. The means may also be implemented as stored computer executable instructions that are presented to computer 805 as data 840 that are temporarily stored in memory 815 and then executed by processor 810.

Logic 830 may also provide means (e.g., hardware, non-transitory computer-readable medium that stores executable instructions, firmware) for performing one or more of the disclosed functions and/or combinations of the functions.

Generally describing an example configuration of the computer 805, the processor 810 may be a variety of various processors including dual microprocessor and other multiprocessor architectures. A memory 815 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 835 may be operably connected to the computer 805 via, for example, an input/output (I/O) interface (e.g., card, device) 845 and an input/output port 820 that are controlled by at least an input/output (I/O) controller 847. The disk 835 may be, for example, a magnetic disk drive, a solid-state drive, a floppy disk drive, a tape drive, a Zip drive, a flash memory card, a memory stick, and so on. Furthermore, the disk 835 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 815 can store a process 850 and/or a data 840, for example. The disk 835 and/or the memory 815 can store an operating system that controls and allocates resources of the computer 805.

The computer 805 may interact with, control, and/or be controlled by input/output (I/O) devices via the input/output (I/O) controller 847, the I/O interfaces 845, and the input/output ports 820. Input/output devices may include, for example, one or more network devices 855, displays 870, printers 872 (such as inkjet, laser, or 3D printers), audio output devices 874 (such as speakers or headphones), text input devices 880 (such as keyboards), cursor control devices 882 for pointing and selection inputs (such as mice, trackballs, touch screens, joysticks, pointing sticks, electronic styluses, electronic pen tablets), audio input devices 884 (such as microphones or external audio players), video input devices 886 (such as video and still cameras, or external video players), image scanners 888, video cards (not shown), disks 835, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on pre-specified system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least a processor of a computing system cause the computing system to:

intercept, from an endpoint of a large language model, an original response by the large language model to an original prompt from a client system, wherein the original response is withheld from being returned to the client system and is redirected into an issue identification analysis, wherein the original response is in natural language;

detect, by the issue identification analysis, that the original response contains an inaccuracy in a numeric comparison by: (i) automatically constructing a mathematical expression from a first number, a second number, and a relationship described in the numeric comparison, and (ii) evaluating the mathematical expression to determine that the numeric comparison fails a validation check;

automatically generate an alternative prompt to the large language model that is configured to cause the large language model to correct the inaccuracy in a rectified response; and return, to the client system, the rectified response by the large language model to the alternative prompt in place of the original response, without returning the original response to the client system, wherein the rectified response is in natural language.

2. The one or more non-transitory computer-readable media of claim 1, wherein the instructions for automatically constructing the mathematical expression further cause the computing system to extract the first number, the second number, and the relationship from the natural language of the original response using an additional prompt.

3. The one or more non-transitory computer-readable media of claim 1, wherein the instructions for detecting that the original response contains the inaccuracy in the numeric comparison further cause the computing system to:

detect language that indicates the numeric comparison in the original response;

based on comparative language in the original response, classify the relationship between the first number and the second number as one of (i) higher than, (ii) equal to, (iii) lower than, (iv) percentage of, (v) fraction of, or (vi) multiple of;

submit to the large language model an additional prompt that corresponds to the relationship, wherein the additional prompt is configured to cause the large language model to extract the first number and the second number from the original response;

populate a logical statement with the first number, the relationship, and the second number to automatically construct the mathematical expression; and evaluate the logical statement to determine that the numeric comparison fails the validation check because the logical statement evaluates to false.

4. The one or more non-transitory computer-readable media of claim 1, wherein the instructions for detecting that the original response contains the inaccuracy in the numeric comparison further cause the computing system to:

detect that the original response includes a difference value between the first number and the second number;

submit to the large language model an additional prompt that is configured to cause the large language model to extract the difference value from the original response;

populate an equation with the first number, the second number, and the difference value to automatically construct the mathematical expression; and evaluate the equation to determine that the numeric comparison fails the validation check because the difference value is incorrect.

5. The one or more non-transitory computer-readable media of claim 1, wherein the instructions further cause the computing system to, prior to detection of the inaccuracy in the numeric comparison:

access structured data that is included in the original prompt to the large language model;

extract source numerical data from the structured data and generated numerical data from the original response; and verify the generated numerical data against the source numerical data.

6. The one or more non-transitory computer-readable media of claim 1, further comprising instructions that when executed by at least the processor cause the computing system to repeat the intercepting of the original response, the detecting that the original response contains the inaccuracy, the generating the alternative prompt, and the returning the rectified response until either: (A) no further inaccuracy is detected, or (B) a threshold for number of iterations is satisfied, wherein the original response for an iteration is the rectified response for a prior iteration.

7. The one or more non-transitory computer-readable media of claim 6, further comprising instructions that when executed by at least the processor cause the computing system to, during the generating the alternative prompt, rotate through a plurality of prompt strategies, wherein the plurality of prompt strategies includes: (i) a first prompt strategy of passing error information about the inaccuracy and suggested rectification to the large language model as context; and (ii) a second prompt strategy of responding to the original prompt with adjusted settings applied to one or more inference parameters.

8. A computer-implemented method, comprising:

intercepting an initial response by a large language model to an initial prompt from a client system, wherein the original response is withheld from being returned to the client system and is redirected into an issue identification analysis;

detecting, by the issue identification analysis, that the initial response contains an inaccuracy in a numeric comparison by: (i) automatically constructing a mathematical expression from a first number, a second number, and a relationship described in the numeric comparison, and (ii) evaluating the mathematical expression to determine that the numeric comparison fails a validation check;

dynamically assembling an alternative prompt to the large language model that is configured to cause the large language model to correct the inaccuracy in a rectified response; and returning, to the client system, the rectified response by the large language model to the alternative prompt in place of the initial response, without returning the original response to the client system.

9. The computer-implemented method of claim 8, wherein detecting that the initial response contains the inaccuracy in the numeric comparison further comprises:

populating a logical statement of the relationship between the first number and the second number to automatically construct the mathematical expression; and evaluating the logical statement to determine that the numeric comparison fails the validation check because the logical statement evaluates to false.

10. The computer-implemented method of claim 8, wherein detecting that the initial response contains the inaccuracy in the numeric comparison further comprises:

detecting a difference value in the initial response;

populating a mathematical statement that subtracts the second number from the first number to produce the difference value to automatically construct the mathematical expression; and evaluating the mathematical statement to determine that the numeric comparison fails the validation check because subtracting the second number from the first number does not equal the difference value, to detect the inaccuracy.

11. The computer-implemented method of claim 8, further comprising verifying that numerical data from the initial response also appear in structured data provided in the initial prompt.

12. The computer-implemented method of claim 8, wherein the intercepting, detecting, and generating steps of the computer-implemented method iterate upon generation of the rectified response until either: (A) no further inaccuracy is detected, or (B) a cap on iterations is reached, wherein the initial response for an iteration is the rectified response for a prior iteration, the computer-implemented method further comprising changing prompt strategies from iteration to iteration.

13. The computer-implemented method of claim 8, further comprising generating the rectified response where a reference text for the numeric comparison is unavailable.

14. A computing system, comprising:

at least one processor connected to at least one memory;

one or more non-transitory computer-readable media that include stored thereon computer-executable instructions that when executed by at least a processor of the computing system cause the computing system to:

intercept an initial response by a large language model to an initial prompt by a client system before the initial response is returned to the client system and redirected to an issue identification analysis;

detect, by the issue identification analysis, that the initial response contains an inaccuracy in a numeric comparison by: (i) automatically constructing a mathematical expression from a first number, a second number, and a relationship described in the numeric comparison, and (ii) evaluating the mathematical expression to determine that the numeric comparison fails a validation check;

generate an alternative prompt to the large language model that is configured to cause the large language model to correct the inaccuracy in a rectified response; and return, to the client system, the rectified response by the large language model to the alternative prompt as a replacement for the initial response.

15. The computing system of claim 14, wherein the instructions for detecting that the initial response contains the inaccuracy in the numeric comparison, when executed by at least the processor, further cause the computing system to detect that the numeric comparison fails the validation check because a logical statement of the relationship between the first number and the second number in the initial response is false.

16. The computing system of claim 14, wherein the instructions for detecting that the initial response contains the inaccuracy in the numeric comparison, when executed by at least the processor, further cause the computing system to detect that the numeric comparison fails the validation check because a mathematical statement to produce a difference value in the initial response by subtracting the second number from the first number is incorrect.

17. The computing system of claim 14, wherein the instructions, when executed by at least the processor, further cause the computing system to detect that there are one or more numbers in the initial response that are unverifiable from structured data used to create the initial prompt.

18. The computing system of claim 14, wherein the instructions for generating the alternative prompt to the large language model that is configured to cause the large language model to correct the inaccuracy in the rectified response, when executed by at least the processor, further cause the computing system to one or more of:

automatically determine an actual relationship between a pair of numbers compared in the numeric comparison; and automatically determine an actual difference between the pair of numbers compared in the numeric comparison.

19. The computing system of claim 14, wherein the computer-executable instructions, when executed by at least the processor, cause the computing system to:

perform the interception, the detection, and the generation for newly-generated rectified responses until either:

(A) no further inaccuracy is detected, or (B) a threshold for number of iterations is satisfied; and during the generation, rotate through a plurality of prompt strategies from iteration to iteration.

20. The computing system of claim 14, wherein the computer-executable instructions, when executed by at least the processor, cause the computing system to present the rectified response in a natural language user interface to a structured database.

\*    \*    \*    \*    \*